United States Patent [19]

Dutta-Choudhury

[11] Patent Number: 5,796,868
[45] Date of Patent: Aug. 18, 1998

[54] OBJECT EDGE POINT FILTERING SYSTEM FOR MACHINE VISION

[75] Inventor: Paul Dutta-Choudhury, Bellingham, Mass.

[73] Assignee: Cognex Corporation, Natick, Mass.

[21] Appl. No.: 579,958

[22] Filed: Dec. 28, 1995

[51] Int. Cl.$^6$ .............................. G06K 9/48; G06K 9/00; G06K 9/52; G06K 9/40
[52] U.S. Cl. .......................... 382/199; 382/151; 382/153; 382/206; 382/263; 382/265; 382/270; 382/281
[58] Field of Search ........................ 382/199, 103, 382/106, 151, 553, 201, 203, 204, 206, 260, 261, 262, 263, 265, 266, 270, 281, 308; 707/521; 711/118, 132; 345/418, 515, 516; 395/80

[56] References Cited

U.S. PATENT DOCUMENTS

| | | | |
|---|---|---|---|
| 4,868,752 | 9/1989 | Fuji | 364/424.02 |
| 5,487,115 | 1/1996 | Surka | 382/199 |
| 5,590,220 | 12/1996 | Takahashi | 382/199 |
| 5,596,655 | 1/1997 | Lopez | 382/199 |
| 5,604,822 | 2/1997 | Pearson et al. | 382/199 |
| 5,616,905 | 4/1997 | Sugiyama | 235/456 |

OTHER PUBLICATIONS

John Francis Canny, "Finding Edges and Lines in Images," ONR Technical Report No. AI-TR-720, Jun. 1983.
Abdou, I.E., "Quantitative Methods of Edge Detection," USCIPI Report 830, Chs. 2 and 7, Image Processing Institute, University of Southern California, Jul. 1978.
Pavlidis, T., "Filling Algorithms For Raster Graphics," SIGGRAPH 1978 Proceedings, Computer Graphics, vol. 12, No. 3, pp. 161–166, 1978.
Ballard, D. H., "Generalizing The Hough Transform to Detect Arbitrary Shapes," Pattern Recognition, vol. 13, No. 2, pp. 111–122, 1981.
Ballard, D. H. et al., Computer Vision, pp. 123–131, Prentice–Hall, Englewood Cliffs, New Jersey, 1982.
Hearn, D. et al., Computer Graphics, pp. 92–96, Prentice–Hall, Englewood Cliffs, New Jersey, 1986.

Primary Examiner—Bipin Shalwala
Attorney, Agent, or Firm—Theresa A. Lober

[57] ABSTRACT

A system and method for filtering edge points in an edge image represented by an array of edge image coordinates each having an edge point magnitude. An edge map array is formed of edge map coordinates each assigned one of three edge indicator values indicative of the relationship between the corresponding edge image coordinate edge point magnitude and two preselected edge magnitude thresholds. An output edge point array is formed of output edge point coordinates to indicate those edge image coordinates and corresponding object image pixels that are validated by the system as being associated with likely object edge points. This is accomplished by constructing a first address stack to track memory addresses at which edge map coordinate values are stored and constructing a second address stack to track memory addresses at which output edge point coordinate values are stored as the output edge point array is constructed. Selected output edge point coordinates are assigned with a preselected edge point value by first scanning the edge map array for edge coordinates assigned the first preselected edge indicator value and, using the stacks to keep track of the addresses of these coordinates, neighboring edge map coordinates are examined for any edge map coordinates assigned with either the first or second preselected edge indicator values. The address of edge map coordinates found to be assigned with either the first or second preselected edge indicator values are then tracked by the stacks.

32 Claims, 12 Drawing Sheets

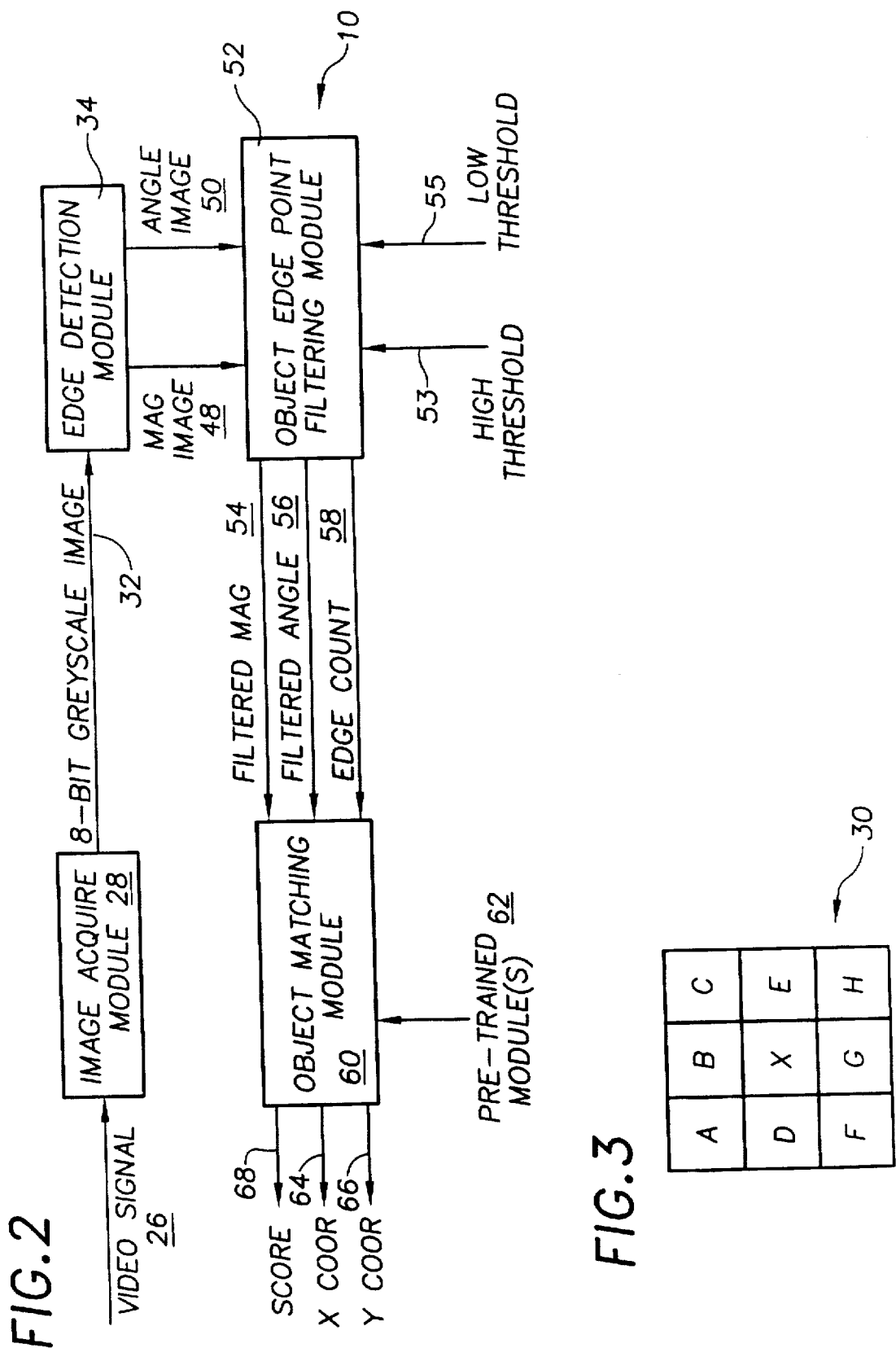

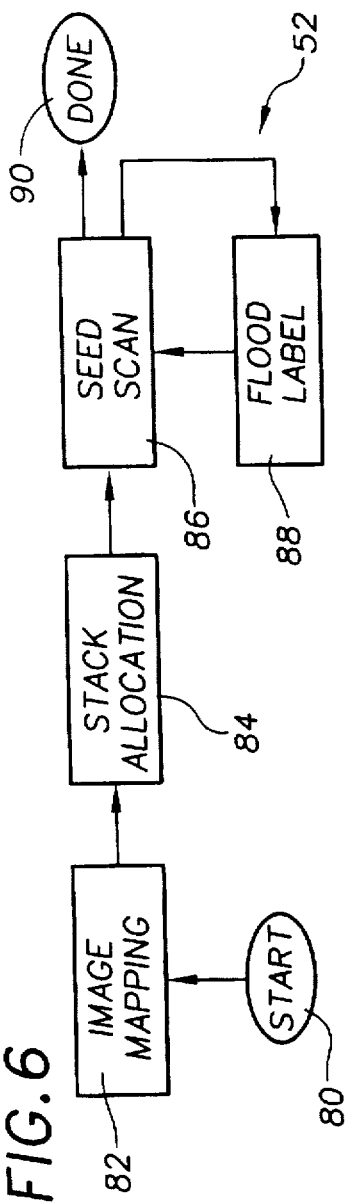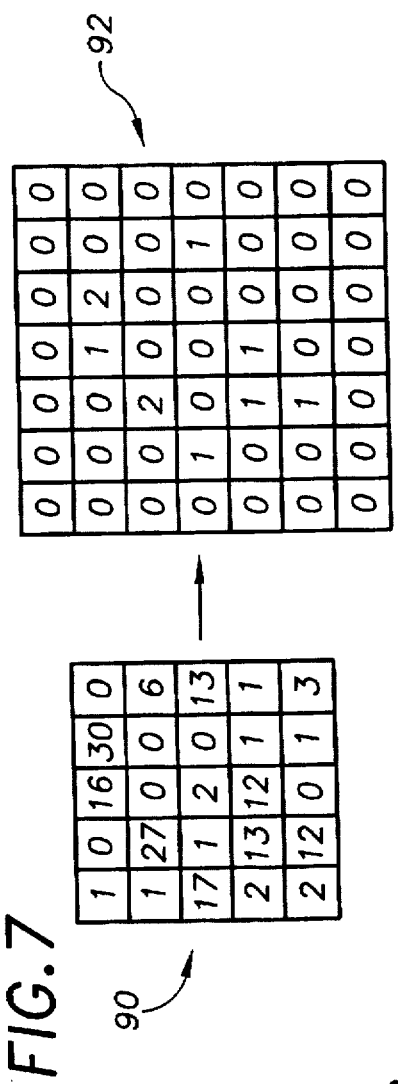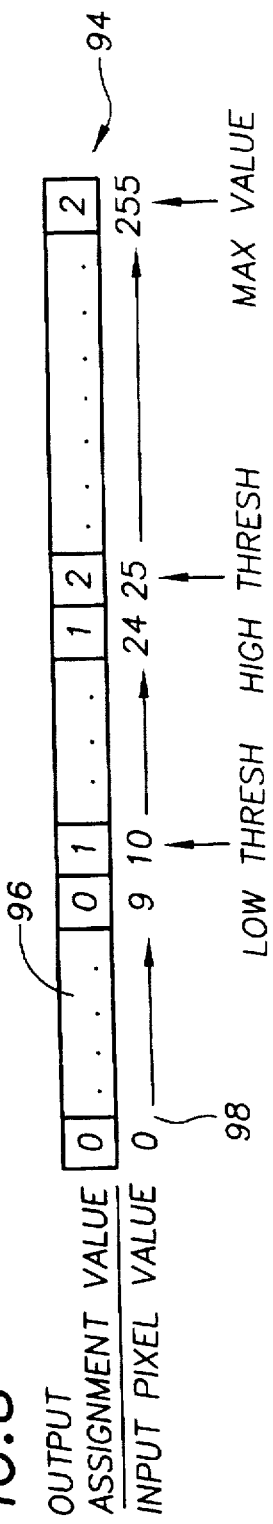
FIG.6
FIG.7
FIG.8

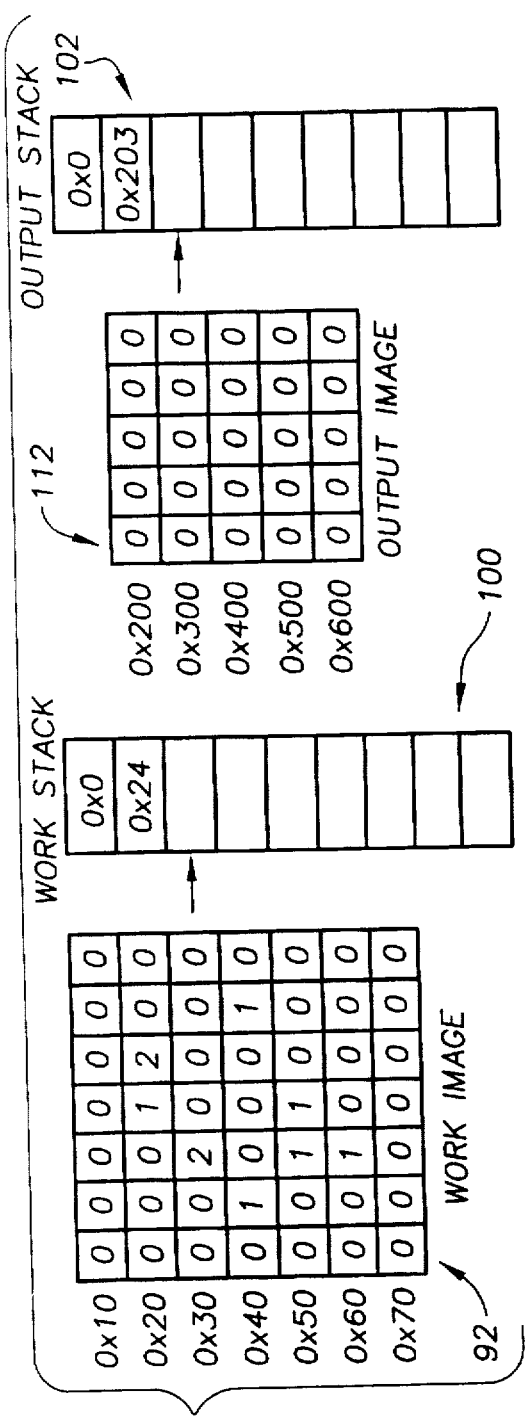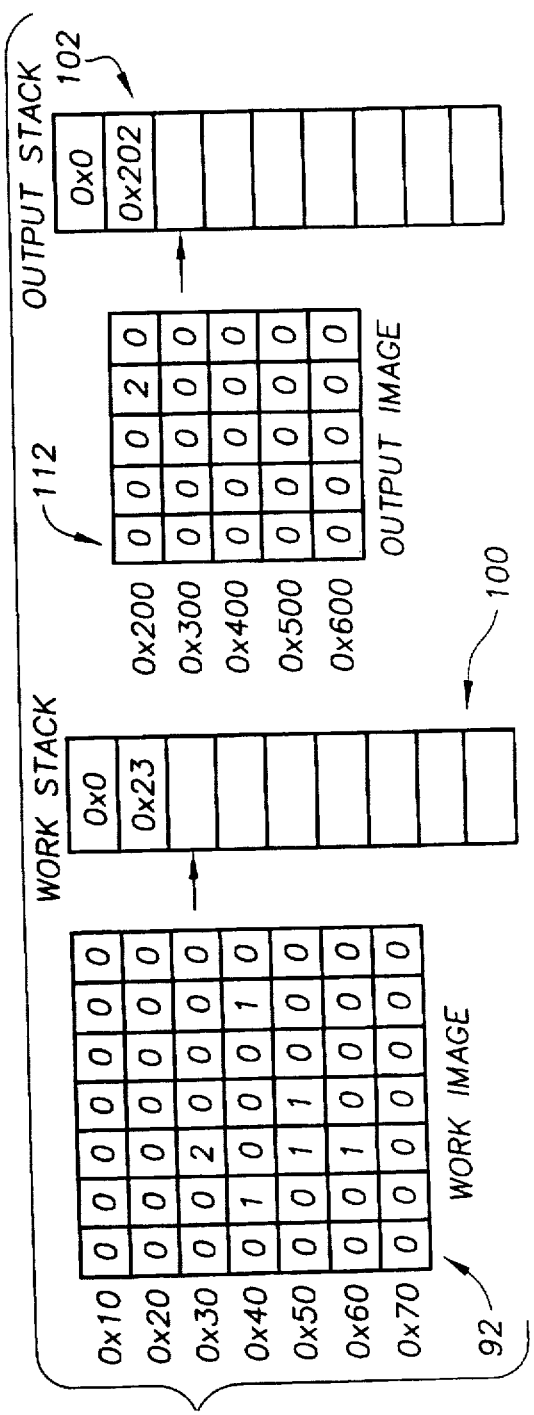

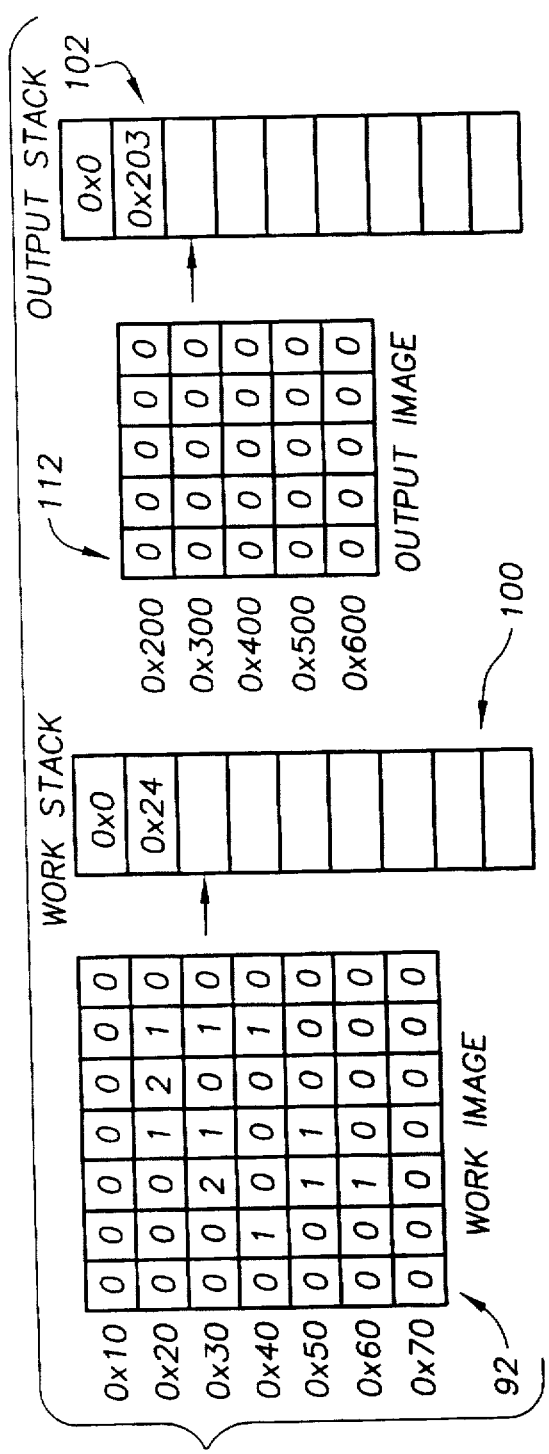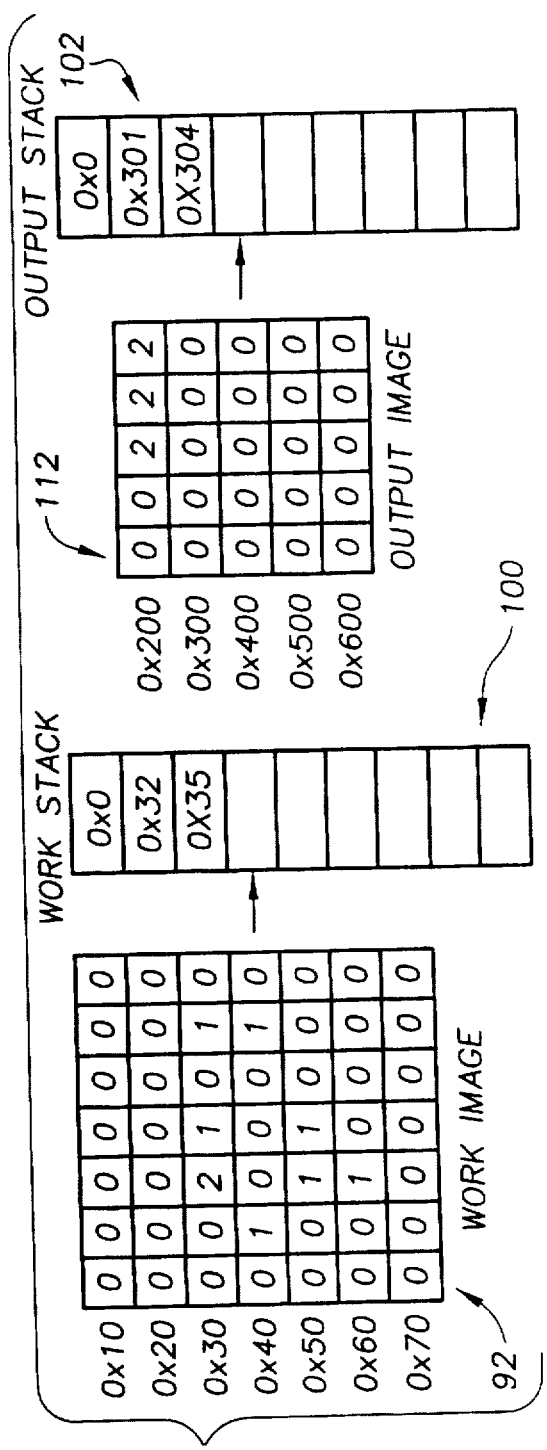
FIG. 12A
FIG. 12B

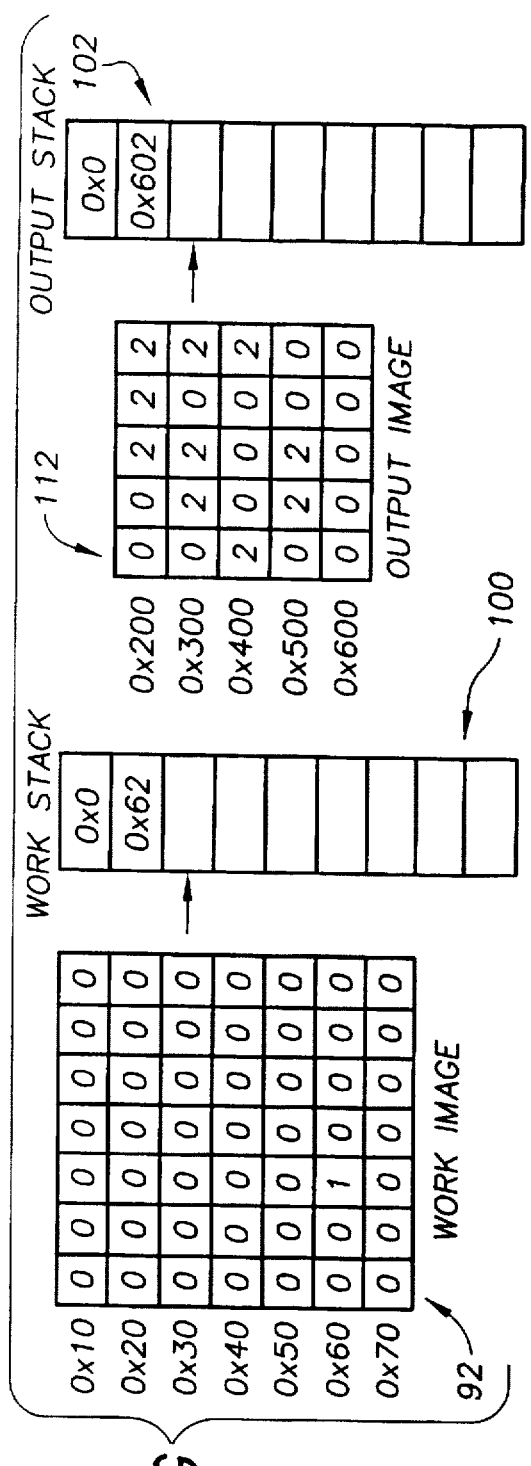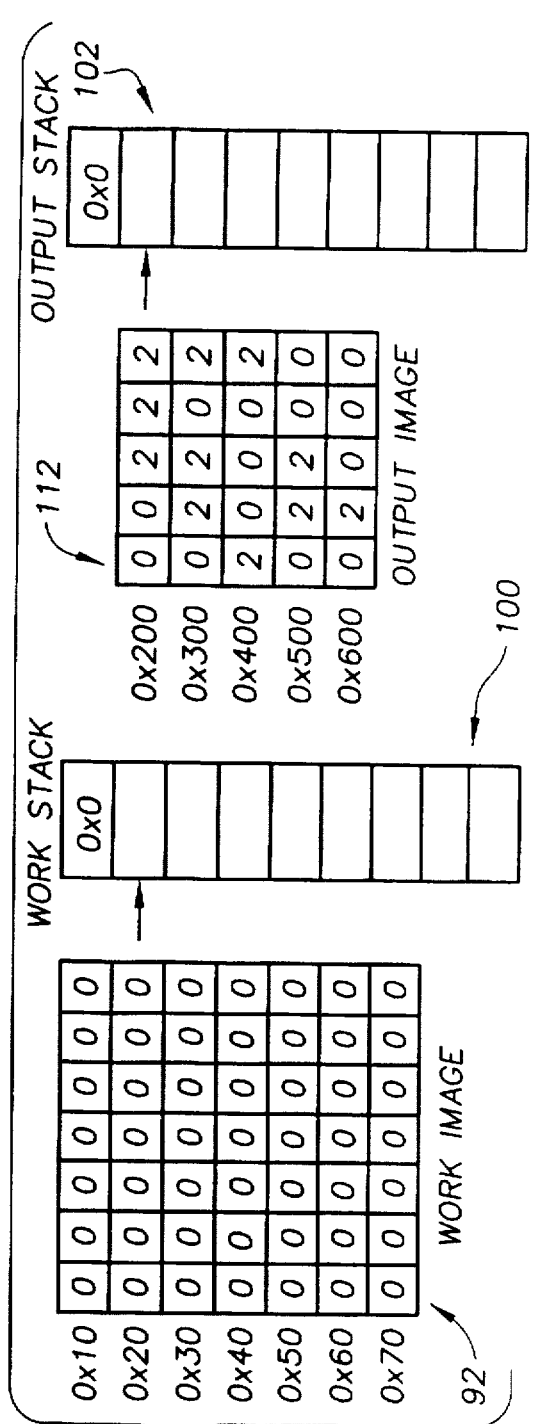

OBJECT EDGE POINT FILTERING SYSTEM FOR MACHINE VISION

FIELD OF THE INVENTION

This invention relates to edge detection methods for machine vision applications, and more particularly relates to techniques for filtering edge information produced by machine vision edge detectors.

BACKGROUND OF THE INVENTION

Machine vision systems are increasingly employed to replace human vision in a wide range of processes such as manufacturing operations. A machine vision system typically provides automated, computer-based image processing capabilities that can be customized for various vision tasks, for example, machine guidance, part identification, gauging, alignment, or inspection tasks. In such tasks, a machine vision system captures an image of an object of interest and processes that image to produce object information such as position or size. This object information is typically provided to, e.g., a computer display for review by an operator, or output to equipment handling the object. For example, object information may be sent to bells, lights or other devices that could alert an operator to a problem. Alternatively, the object information might be sent to a mechanical diverter that removes defective parts from a manufacturing line, or to a positioning table that moves objects into position prior to a manufacturing step.

One important image processing capability typically provided by machine vision systems is object edge detection. Object edge detection is generally achieved by extracting selected information from an object image and evaluating the selected information to locate edge points within the object image. Edge point information, e.g., edge point magnitude or edge point angle, can then be used for determining, e.g., object size or position.

One of the fundamental challenges for machine vision object edge detection is that of edge detection in low contrast, high noise object image environments. Background image noise captured during object image acquisition introduces spurious image data that may result in spurious edge point data. Object image acquisition in low contrast image environments may result in edge point data that is only marginally distinctive over surrounding image data.

Typically, machine vision systems employ one or more techniques intended to compensate for high noise, low contrast object image data that may be introduced to an edge detection system. In one such technique, candidate edge point data produced by an edge detection system is compared to a single threshold edge magnitude value; only candidate edge points having magnitudes larger than the threshold edge magnitude are confirmed as edge points. This technique tends to break down, however, under the dual functional requirement of eliminating a large percentage of spurious edge data while at the same time effectively preserving true edge data, "true edge data" here referring to that edge data that is genuinely attributable to the object. As a result, such a single threshold technique generally requires either lowering the edge threshold magnitude to a level at which many spurious edge data points are accepted in order to preserve the true edge data, or raising the threshold magnitude to a level at which some of the true edge data is lost in order to reduce the amount of accepted spurious edge data.

The so-called Canny Hysteresis Thresholding technique (CHT), described in, e.g., "Finding Lines and Edges in Images," by J. F. Canny, *MIT AI Lab Technical Report AI-TR*-720, 1983, is a dual threshold filtering system that can provide an improvement in effectiveness over a single threshold system. The CHT process is based on a high edge point magnitude threshold and a low edge point magnitude threshold, and additionally includes an edge point connectivity requirement. The low threshold represents the edge point magnitude above which an edge point may be accepted as valid and the high threshold represents the edge point magnitude above which an edge point is unconditionally accepted as valid. Edge point magnitudes less than the low threshold are automatically identified as being invalid. Edge points having magnitudes between the low and high thresholds are examined to determine if they are connected to an edge point having a magnitude that exceeds the high threshold magnitude; if so, such marginal edge points are considered valid.

Traditionally, the CHT dual threshold process has been implemented in, e.g., machine vision systems, as a recursive technique in which marginal candidate edge data produced by an edge detection process are tested regarded satisfaction of the CHT connectivity constraint in a manner that requires a recursive function call for each neighboring and marginal candidate edge point. In other words, for each marginal candidate edge point in an object image, a connectivity search is undertaken, until neighboring points for all marginal candidate points in the object image are examined. In this way, only one object edge point can be confirmed during each of the nested searches.

Although this CHT technique is useful for teaching purposes, it is highly inefficient and unacceptably slow for practical applications because a significant portion of processing time and resources are used for overhead processing tasks required for the recursive edge point connectivity searches. Indeed, the edge point identification functionality provided by the recursive technique actually involves less processing than the overhead processing required to advance that functionality from one recursive pass to the next. With these limitations, the recursive CHT technique is not suitable for real-time machine vision applications wherein efficient, high-speed object edge point identification is required.

In fact, as a practical matter, some manufacturing processes employing edge detection cannot accommodate any substantial speed reduction required by inclusion of an edge point filtering system, even if that system produces enhanced edge data. Nevertheless various single and dual threshold edge filtering and verification methods, like those discussed above, have been implemented and included in machine vision systems; however, they have required a tradeoff in one or more of speed, efficiency, effectiveness, or other performance characteristics required of conventional real-time machine vision applications, resulting in suboptimal edge detection or other degradation in overall machine vision system performance.

PROBLEMS TO BE SOLVED BY THE INVENTION

It is a goal of the present invention to overcome the speed, efficiency, and other associated limitations of past object edge point filtering systems. It is a further goal of the invention to provide a high-speed filtering system that filters possible edge points in an object image in a computationally efficient manner. It is a further goal of the present invention to filter possible edge points in an object image such that a large fraction of spurious edge points in the object image are eliminated. It is an additional goal of the present invention to substantially maintain true edge points in an object image as a result of filtering possible edge points in the object image.

SUMMARY OF THE INVENTION

The invention provides a system for filtering possible edge points in an edge image represented by an array of edge image coordinates, where each coordinate has an edge point magnitude in a preselected range of edge point magnitudes. This edge image corresponds to an image of an object represented by an array of pixels. According to the invention, an edge map array is formed of edge map coordinates arranged in correspondence with the edge image, with each edge map coordinate assigned one of three preselected edge indicator values, such as 2, 1, or 0, indicative of the relationship between the corresponding edge point magnitude and two preselected edge point magnitude thresholds. The assigned edge map coordinate values are stored in an addressable memory.

In the invention, an output edge point array is formed of output edge point coordinates, arranged in correspondence with the edge image. The output edge point array indicates which of the object image pixels are validated by the system as being object edge points. This output edge point array is formed by the filtering system of the invention by first initializing each output edge point coordinate to a first of two preselected output edge point values, e.g., 0 and 2, where, e.g., 2 indicates validation of a likely or marginal edge point as a valid edge point and 0 indicates nonvalidation of a spurious or marginal edge point, and storing the initialized output edge point coordinate values in an addressable memory. Then a first address stack is constructed to track memory addresses at which edge map coordinate values in the edge map array are stored; similarly, a second address stack is then constructed to track memory addresses at which output edge point coordinate values in the output edge point array are stored. Then selected initialized output edge point coordinates are assigned the second preselected edge point value. This selective assignment is produced by first scanning the edge map array for an edge coordinate assigned the first preselected edge indicator value, e.g., 2, and pushing on the first stack the edge map array address of that first encountered edge map coordinate. Then the output edge point array address corresponding to the edge map array address pushed on the first stack is pushed on the second stack.

Then in an iterative technique implemented by the filtering system, the edge map array address and corresponding output edge point array address that were together most recently pushed on the stacks are popped off the first and second stacks, respectively, and the edge map coordinate at the address popped off the first stack is assigned the third edge indicator value, e.g., 0, while the output edge point coordinate at the output edge point array address popped off the second stack is assigned the second preselected edge point value, e.g., 2. At this point, the edge map coordinates in the edge map array that neighbor the edge map coordinate whose address was popped off the first stack are examined for any edge map coordinates assigned with either the first or second preselected edge indicator values (e.g., 2 or 1); the address of edge map coordinates found to be assigned with either the first or second preselected edge indicator values are then pushed on the first stack and the output edge point array address corresponding to any edge map array address pushed on the first stack is pushed on the second stack.

In the invention, this iterative process is repeated until all addresses are popped off of the first and second stacks and the edge map array is entirely scanned. The system produces, as a result, an output edge point array having selected output edge point coordinates that are assigned the second preselected edge point value for representing likely edge points in the object image while the remaining output edge point coordinates are assigned the other edge point value for representing nonvalidated edge points. With this technique, the object edge point filtering system of the invention imposes a dual edge thresholding constraint, as well as a connectivity constraint, in an efficient method that provides both higher speed and efficiency than prior edge point filtering systems.

In preferred embodiments of the object edge point filtering system, the two preselected edge point magnitude thresholds comprise a high threshold and a low threshold of a magnitude less than that of the high threshold, and the three preselected edge indicator values include a first edge indicator value for indicating that a selected edge map coordinate magnitude value in the edge image is greater than the high threshold, a second edge indicator value for indicating that a selected edge map coordinate value in the edge image is equal to or less than the high threshold but greater than or equal to the low threshold, and a third edge indicator value for indicating that a selected edge map coordinate value in the edge image is less than the low threshold. Preferably, the two preselected edge point values include a first edge point value for indicating that a selected output edge point coordinate does not likely represent an edge point in the object image and a second edge point value for indicating that a selected output edge point coordinate does likely represent an edge point in the object image.

In preferred embodiments, the first and second stacks are constructed by determining the number of edge map coordinates in the edge map array assigned either the first or second preselected edge indicator values, and allocating a number of entries in each stack equal to at least the number of edge map coordinates assigned either the first or second preselected edge indicator values, or are constructed by determining the total number of edge map coordinates in the edge map array and allocating a number of entries in each stack equal to at least the total number of edge map coordinates. Preferably, in the process of examining edge map coordinates in the edge map array that neighbor the edge map coordinate whose address was popped off the first stack, each of eight edge map coordinates that are closest neighbors to the edge map coordinate whose address was popped off the first stack are examined.

In other preferred embodiments, the edge map array is provided with bounding rows and columns of edge coordinates that together surround the array, with each edge coordinate in the bounding rows and columns assigned the third preselected edge indicator value.

In still other preferred embodiments, in scanning the edge map array for an edge coordinate assigned with the first preselected edge indicator value, a packet of digital bits representative of consecutive edge map coordinates in a row of the edge map array is formed and the packet of digital bits is examined for the first preselected edge indicator value; preferably, each edge coordinate value is represented by a number, n, of bits, and the packet of digital bits includes an integer multiple of the number, n, of bits.

In yet other preferred embodiments, examination of edge map coordinates in the edge map array that neighbor the edge map coordinate whose address was popped off the first stack is produced by examining edge map coordinates in the same row as the popped edge map coordinate address to locate edge map coordinates in that row assigned either the first or second preselected edge indicator values and located in an unbroken sequence including the edge map coordinate whose address was popped. Any such located coordinates and the popped edge map coordinate are all assigned the third preselected edge indicator value, with the corresponding output edge point array coordinates assigned the second edge point value. Then edge values in the row just above and the row just below the popped edge value are examined beginning with the edge value in each of these rows that has an address one less than the leftmost edge value identified in the unbroken sequence and ending with the edge value in each of these rows that has an address one greater than the rightmost edge value identified in the unbroken sequence, and based on the examination, pushing on the first stack the address of each examined edge map coordinate in the above and below rows that is both assigned with either the first or second preselected edge indicator values and either the first edge coordinate examined in a given row or located after an edge coordinate assigned with the third preselected edge indicator value.

In other preferred embodiments, the object edge filtering system forms an edge image template representing an image of likely edge points in the object image based on the output edge point array, the system preferably forms an edge point address list of the memory addresses corresponding to the output edge point coordinates assigned with the second preselected edge point value, the system preferably forms a filtered object image by setting to zero all pixels in a copy of the object image that correspond to edge point coordinates in the output edge point array assigned with the first preselected edge point value, and the system preferably forms an edge point angle map array of edge angle values arranged in correspondence with the edge image array, the edge angle values representing the angular orientation of corresponding output edge points in the output edge point array. Preferably, the edge image array is formed by performing Sobel edge detection analysis on the object image.

The object edge point filtering system of the invention provides superior object edge image analysis that results in enhanced accuracy and speed in a wide range of machine vision applications. For example, the edge point filtering system can be employed with a machine vision alignment system for automatically and precisely positioning parts prior to a manufacturing process such as drilling, semiconductor wafer processing, or adhesive dispensing. Similarly, a machine vision guidance system employing the edge point filtering system enhances the ability to capture an image of a part to be picked up and placed, such as an electronic chip, and to precisely locate the part and verify its position. Machine vision inspection and gauging applications similarly are enhanced with the edge point filtering system. Such an inspection system, e.g., locates a part and analyzes its image to identify any geometric defects or specific features of interest such as proper label alignment. A gauging system determines the distance between features on a part with enhanced accuracy to measure, e.g., the spacing between threads on a screw. Machine vision character recognition systems are likewise enhanced by the edge filtering system of the invention. With the precise edge point analysis provided by the invention, such systems can, for example, accurately determine the identity of printed characters without prior expectation of character identity, for parts tracking or record keeping operations, or provide verification of imprinted characters, e.g., during credit card account number imprinting operations. Many other machine vision applications are enhanced by the efficient and fast object edge point filtering system of the invention. Other features and advantages of the invention will be apparent from a description of a preferred embodiment, and from the claims.

BRIEF DESCRIPTION OF THE DRAWINGS

FIG. 2 is a schematic block diagram of the machine vision system of FIG. 1;

FIG. 3 is a diagram of an object image pixel grid with pixels labeled in accordance with a regular image pixel memory address format in accordance with the invention;

FIG. 6 is a schematic block diagram of internal modules in the object edge point filtering module of the machine vision system of FIG. 2 and in accordance with the invention;

FIG. 7 is a diagram of an example edge image array and an example work image grid mapped from the edge image array by the object edge point filtering module of FIG. 6 in accordance with the invention;

FIG. 8 is a diagram of an example Look-Up-Table employed by the object edge point filtering module of the invention for producing the example work image pixel grid of FIG. 7;

FIGS. 10A–D are diagrams of the work image memory address stack and output edge point address stack of FIG. 9A and the example output edge point array and work image grid of FIG. 9B all shown at successive points in a first sequence of operations for determining the coordinate values of the output edge point array in accordance with the invention;

FIGS. 12A–12H are diagrams of the work image memory address stack and output edge point memory address stack of FIG. 9A and the example output edge point array and work image grid of FIG. 9B all shown at successive points in the sequence of operations diagrammed in FIG. 11.

DESCRIPTION OF A PREFERRED EMBODIMENT

Figure 1A:
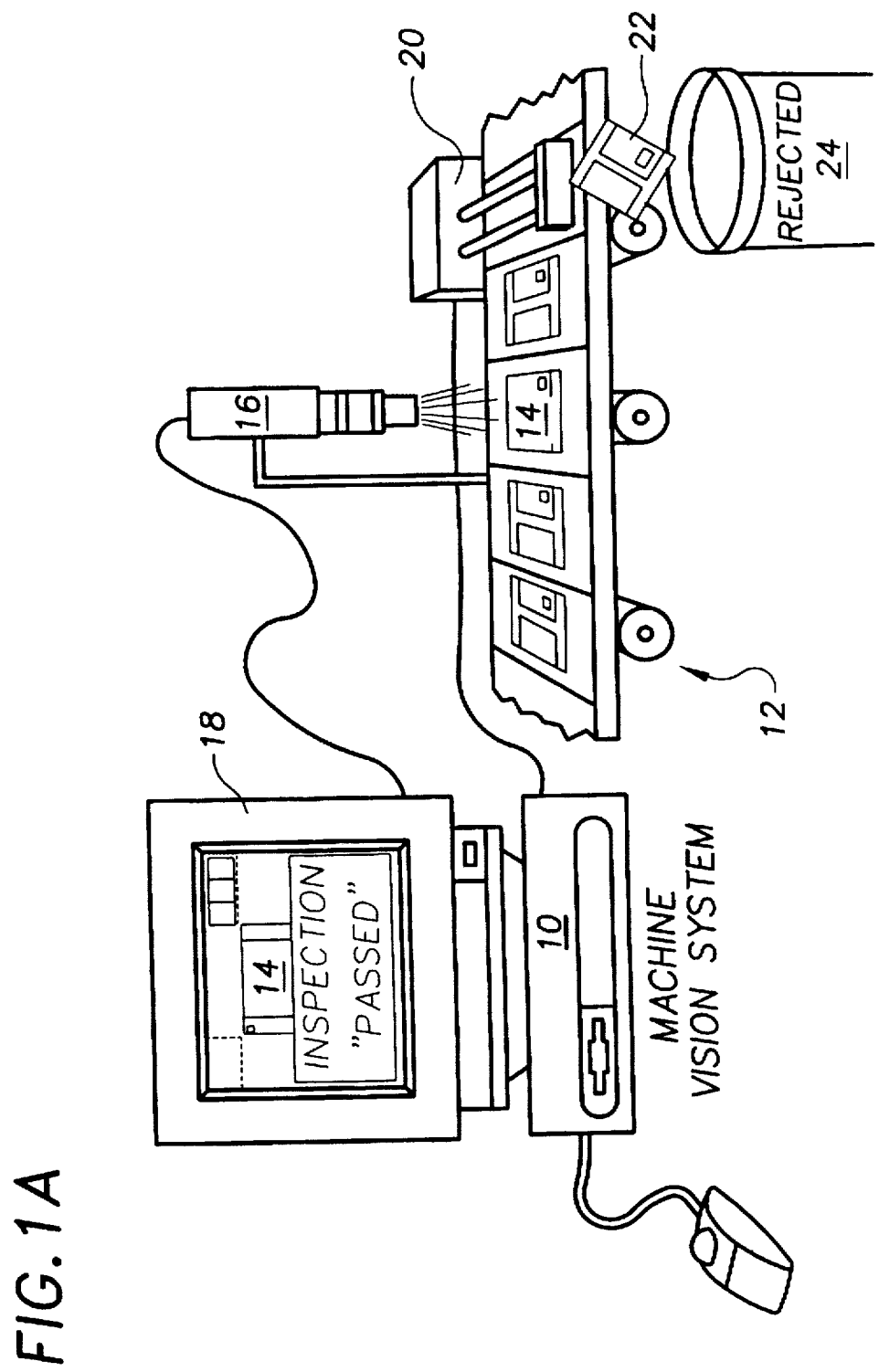
FIG. 1A is a schematic perspective view of a machine vision inspection system in accordance with the invention, shown employed with a computer disk manufacturing line.

Referring to FIG. 1A, in accordance with the present invention there is provided an object edge point filtering system that can be employed by, for example, a machine vision system for aid in making decisions and providing information about objects in a process such as a manufacturing process. For example, the edge point filtering system can be employed in a machine vision inspection system 10 for a manufacturing line such as a computer disk manufacturing line 12, as shown in the figure. Using the inspection system, computer disks 14 can be inspected for compliance with metrics such as size, shape, or other characteristic.

The image of a computer disk 14 to bas a CCD camera, connected to the a 16, such as a CCD camera, connected to the vision system for conversion by the machine vision system 10 to a digital representation, e.g., a greyscale representation, of the computer disk image. The machine vision system can include a display monitor 18 or other means for displaying the acquired computer disk image for a manufacturing line operator. After determining the edge points of the computer disk 14 under inspection, the machine vision system can provide information about the disk's position, geometry, size, or other characteristic. For example, the machine vision system might determine if the computer disk under inspection meets quality control standards for size. These standards can be "taught" to the vision system by way of, e.g., training models of disks that meet the control standards. The vision system compares the disk under inspection with its pre-trained models to determine if the disk meets the size standards.

If the vision system ascertains that the disk under inspection does meet the standards, an indication of such condition can be provided on the display 18 as, e.g., the word "Passed," or can be provided to an operator or automatic indicator on the assembly line in another fashion. Alternatively, no indication other than the continuation of the disk to later stages of the assembly process may be provided. If the vision system ascertains that a disk under inspection does not meet the standard, a mechanical manipulator, for example, a mechanical diverter 20 as shown in the figure connected to the vision system, can be signaled to remove a faulty disk 22 from the line when the faulty disk 22 is conveyed to the location of the diverter. The diverter might move the faulty disk off of the line and into, e.g., a storage receptor 24 for rejected disks. As will be recognized by those skilled in the art, many alternative object inspection and manipulation functions can be provided in a manufacturing line machine vision system like that of FIG. 11.

Figure 1B:
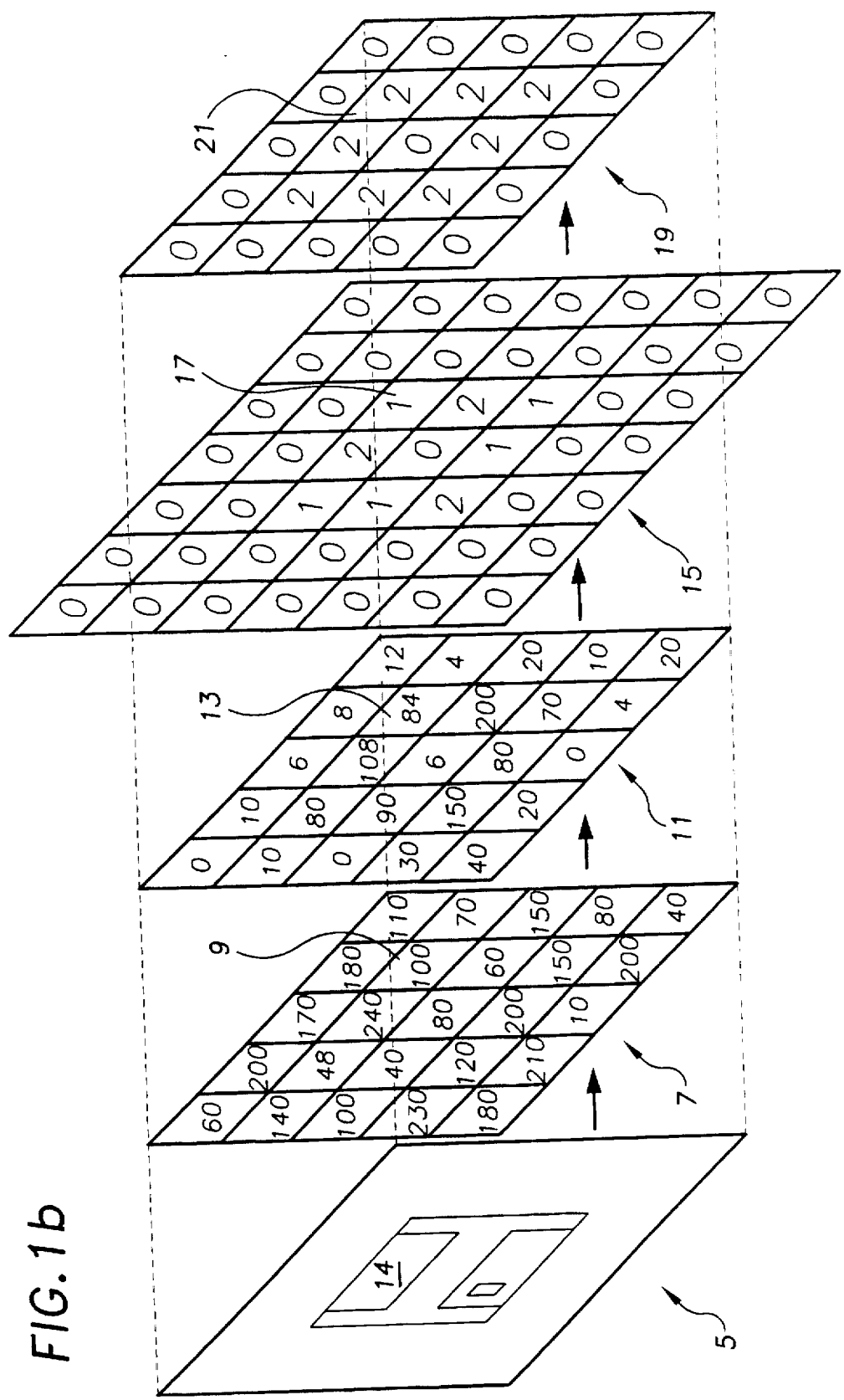
FIG. 1B is a schematic view of an acquired video image, the corresponding digitized object image, and corresponding edge point image, edge map array, and output edge point array produced in accordance with the invention.

An example of the image analysis processing provided by a machine vision system that includes the object edge point filtering system of the invention is illustrated in FIG. 1B. The image of an object to be analyzed, such as a computer disk 14, is acquired, as described above, to produce, e.g., a video frame 5 of the image. This video image is digitized and converted to an object image represented by an array of pixels 7; i.e., an object image pixel array, or grid, of greyscale values is produced to represent the object. For example, one pixel 9 in the object image pixel array has a greyscale value of 100, reflecting the image intensity of the corresponding location in the video frame.

An edge detector in the machine vision system processes the object image pixel array to produce an edge image array 11 of edge image coordinates that correspond directly to the object image pixel array. Each edge image coordinate consists of a value indicative of the edge magnitude associated with a corresponding pixel in the object image pixel array. Accordingly, the one object image pixel 9 having a greyscale value of 100 corresponds to an edge image coordinate 13 of value 84.

The object edge point filtering system of the invention processes the edge image array 11 to produce an intermediate edge map array 15 of coordinates, corresponding to the edge image, with an edge indicator value assigned to each coordinate based on a relationship between the corresponding edge image coordinate in the edge image 11 and two edge point magnitude thresholds. The edge map array 15 includes bordering rows and columns of coordinates to facilitate efficient processing of the array, as explained in detail later in the discussion. As shown in this example, the edge image coordinate 13 having a value of 84 is associated with an edge map array coordinate 17 that contains a value indicating that the corresponding pixel 9 is considered to be associated with a marginal edge point. A first selected value, e.g., 2, is assigned to all coordinates for which the corresponding edge image coordinate is considered to be associated with a valid edge point; a second selected value, e.g., 1, is assigned to all coordinates such as coordinate 17 for which the corresponding edge image coordinate is considered to be associated with a marginal edge point; and a third selected value, e.g., 0, is assigned to all coordinates for which the corresponding edge image coordinate is considered not to be associated with an edge point.

Then, the object edge point filtering system produces an output edge point array 19 of coordinates, corresponding to the edge image array 11 and object image pixel array 7, with assigned values that distinguish those coordinates that are considered to be valid object edge points from those coordinates that are not considered to be valid object edge points. For example, the one object image pixel 9 having a greyscale value of 100 and identified in the edge map array 15 as being associated with a marginal edge point results in an output edge point array coordinate 21 that contains a value indicating that the pixel 9 is considered to be associated with a valid edge point. A first selected value, e.g., 2, is assigned to all output edge point coordinates considered to be associated with valid edge points, while a second selected value, e.g., 0, is assigned to all other output edge point coordinates.

Considering now the components of the machine vision system 10 in more detail, as shown in FIG. 2, an object image signal 26, e.g., a video signal, of an object to be considered by the vision system is input to an image acquire module 28. A CCD camera such as an RS-170 camera, i.e., a camera that meets true RS-170 standards, a CCIR camera, or other suitable camera can be used to produce the object image signal 26. After acquiring an image signal, the image acquire module 28 digitizes the signal to produce a 2-dimensional grid of pixel values that correspond to the object image signal. In one example embodiment, the image acquire module provides an analog-to-digital (A/D) converter that operates on a dual-ported frame memory of, e.g., 1024×512 pixels in size for capturing each input frame of a single object image signal input channel. Alternatively, the image acquire module can provide, e.g., a single A/D converter channel multiplexed to several image signal inputs. As will be recognized by those skilled in the art, various other configurations, e.g., multiple parallel A/D converters for asynchronous and simultaneous acquisition of multiple object images, or other configuration, can also be employed.

The digitized object image is configured by the A/D conversion to a suitable digital pixel representation for the image processing to be undertaken. For example, the object image signal can be digitized to produce a greyscale pixel image grid of, e.g., 576×448 pixels, 640×480 pixels, or other suitable grid size. Each pixel consists of, e.g., an 8-bit binary value in the range of 0 to 255 corresponding to the scalar intensity of the object image at a location associated with that pixel. A color, rather than greyscale, image representation may be preferable for some applications. The scalar pixel intensity values can be stored in other suitable memory packet sizes and corresponding ranges of possible values. The pixel values are stored in, e.g., memory in a suitable format.

One preferable pixel value storage format that facilitates processing by the edge filtering system of the invention is described in connection with FIG. 3. Given an object image pixel grid of any size, such as the example grid 30 of 3×3 pixels, the memory addresses for the greyscale values of the pixels in the grid preferably follow a so-called regular image format. In this format, each pixel value in a given row of pixels is stored sequentially in memory, and the difference in memory addresses between pixels in a given column and adjacent rows is a constant for all rows. For example, as shown in FIG.3, for the pixels labeled A-H and X in the example grid, given that a is the address of pixel X and that r is the row address difference, i.e., the address difference between pixels in the same column and in two adjacent rows, then the addresses of the pixels, relative to the address of pixel X, is given as follows in Table 1:

TABLE 1

Regular Image Format Pixel Address Assignments

| address (A) = a − r − 1 | address (E) = a + 1 |
| address (B) = a − r | address (F) = a + r − 1 |
| address (C) = a − r + 1 | address (G) = a + r |
| address (D) = a − 1 | address (H) = a + r + 1. |

This regular image format is flexible in that each row does not have to follow sequentially in memory, i.e., although pixels within a row are stored sequentially, the rows within a grid may be separated in memory. However, any such separation must accommodate the requirement for a constant address difference between pixels in a given column and adjacent rows. Stated another way, the constant and required row address difference does not need to be equal to the width of a row. This flexibility accommodates applications wherein, e.g., a grid under consideration is actually a window in a larger image grid. This regular image format pixel addressing is extendible to any pixel grid size. The image processing advantages provided by this format will become apparent in later discussions of the edge point thresholding process. As will be recognized by those skilled in the art, other pixel addressing formats can be employed.

Figure 4:
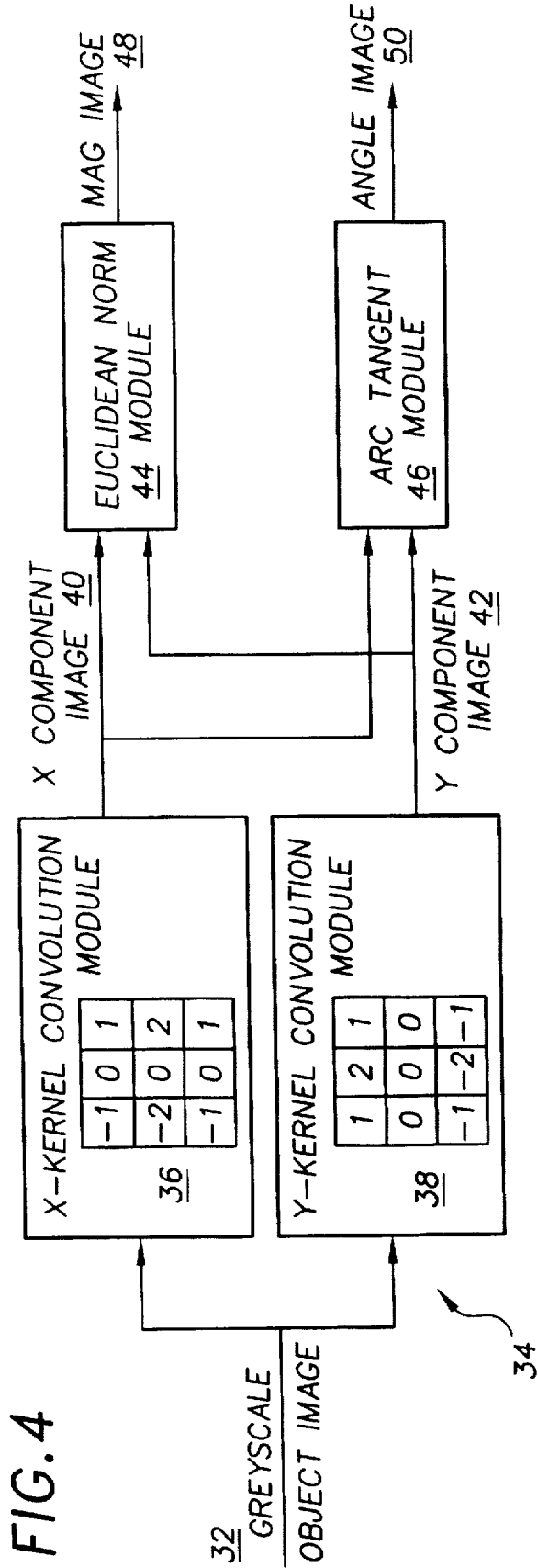
FIG. 4 is a schematic block diagram of internal modules in the edge detection module of the machine vision system of FIG. 2.

Whatever pixel addressing format is employed, the digital greyscale pixel grid representation of the object to be considered by the machine vision system is input to one or more image processing modules, such as an edge detection module 34, shown in FIG. 2. Turning also to FIG. 4, the edge detection module 34 processes the pixel object representation to ascertain the locations of edge points of the object within the representation. In one example suitable edge detection process, the so-called Sobel edge detection process is undertaken to convert the scalar pixel intensities to a vector image. In this process, the scalar intensity value for each pixel in the pixel object representation is processed to produce two corresponding edge images, one for edge magnitudes and the other for edge angles. This process has the effect of computing an approximation to the first derivative of the original greyscale object representation. The Sobel process is described in, e.g., "Quantitative methods of edge detection," by I. E. Abdou, in *USCIPI Report* 830, Image Processing Institute, Univ. Southern California, July 1978.

Specifically, the Sobel edge detection process accepts the greyscale object representation 32 and separately convolves the pixel values of that representation with the values of the two mask grids, an X-mask grid 36 and a Y-mask grid 38. As shown in FIG. 4, the X- and Y-mask grid values correspond, respectively, to changes in the object image in the X and Y directions. The output of the two convolutions are two edge image grids, an X-component grid 40 and a Y-component grid 42. These grids represent the X- and Y-components of the rate of change of intensity value at each pixel in the greyscale object representation 32.

The magnitude and angle of intensity change rate of the grid coordinates in the X- and Y-component edge image grids 40, 42 are then computed by a Euclidean norm module 44 and arc tangent module 46, respectively. Accordingly, the coordinate values of both the X- and Y-component image grids 40, 42 are input to both the Euclidean norm module 44 and the arc tangent module 46. An edge image array, or grid 48, output by the Euclidean norm module 44, provides an array of coordinates representing the intensity value of candidate edge points within the object representation. Similarly, an edge angle grid 50, output by the arc tangent module 46, provides an array of coordinates representing the angle of positioning of candidate edge points within the object representation.

Referring back to FIG. 2, the edge image grid 48 and edge angle grid 50 are input to the object edge point filtering system 52 of the invention. This system, described in detail below, provides one or more outputs that are more precise and less noisy versions of the input edge magnitude and angle data, as well as additional information relating to the number of object edge points. For example, as shown in FIG. 2, the object edge point filtering system can provide an output object edge point array 54, a filtered object edge angle grid 56, an edge count 58, and if suitable, other object edge point characteristics. The functionality and outputs of the filtering system 52 are presented in detail later in the discussion.

The object edge point information produced by the object edge point filtering system is input to one or more image processing modules for making decisions about an object under consideration by the machine vision system. For example, as shown in FIG. 2, the object edge point information can be input to an object matching module 60 that, e.g., compares the object information with one or more pre-trained models 62 of various characteristics of the object under consideration. Such training models 62 might describe, e.g., standards for an object's size, alignment, or position.

One example suitable matching module 60 is a General Hough Transform process module. The Hough Transform is a pattern recognition technique that enables a machine vision system to represent image information such as greyscale edge information in various feature transform coordinate systems, known as "Hough Space," for facilitating decision making about the object under consideration. This technique is described in, e.g., "Generalizing the Hough Transform to detect arbitrary shapes," by D. H. Ballard in *Pattern Recognition*, Vol. 13, No. 2, 1981, pp. 111–122 and in *Computer Vision*, Prentice-Hall, Engl. Cliffs, N.J., 1982, pp. 123–131.

Utilizing the Hough Transform technique, the matching module 60 produces, e.g., an indication of the X- and Y-coordinates, 64, 66, respectively, of the object under consideration, a "score" 68 indicating the degree to which the object under consideration conforms to pre-trained models 62, and/or other information about the object under consideration for making decisions about, e.g., manipulation or assembly processes with the object. This output object information is provided as, e.g., a digital output on a corresponding number of output lines such as opto-isolated output lines that suppress noise introduction back into the system. As shown in FIG. 1, the object information can be displayed on a monitor or sent to an object manipulator for movement of an object under consideration, or can be printed out, announced audibly, or provided in another suitable manner for a specific application.

Figure 5:
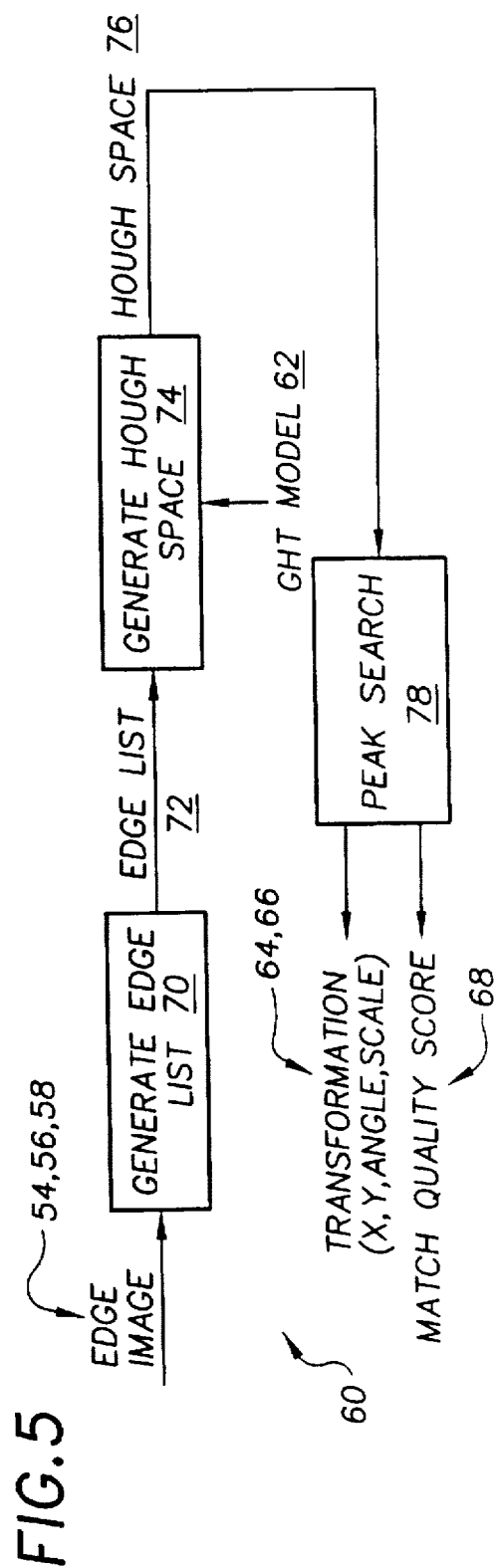
FIG. 5 is a schematic block diagram of internal modules in the matching module of the machine vision system of FIG. 2.

Referring now to FIG. 5, in an example Hough matching module 60 an image such as an edge image, produced by the filtering system of the invention, and including, e.g., filtered edge magnitude information 54, filtered edge angle information 56, and/or an edge count 58 is input to an edge list generation module 70. This module produces a representation of the input information in the form of a list 72 of n-tuples that encodes the information. In the example illustrated, the module specifically employs object edge point information as the relevant geometric characteristic to be encoded. The edge list 72 produced by the generation module 70 is then input to a Hough Space generation module 74. This module defines a coordinate system for the edge list 72 based on a model 62 for which the module was previously trained.

A Hough Space model 62 might include, e.g., an encoded subset of edges present in a training object. Generally, one can specify either synthetic object data, like edge information, or manually edited data as the input to a training procedure. This assures that all edges present in the model comprise actual object image signals and that they are not the result of noise or other unrelated features. In generating a Hough Space, the generation module 74 compares the model 62 with the input edge list 72 to produce a Hough Space 76 for the input edge list 72 indicative of its likeness to the model. Then a peak search module 78 evaluates the Hough Space 76 to ascertain the maximum value of the geometric characteristic of interest, the second highest value, and so forth.

The results of this peak search then provide the information necessary for the Hough module 60 to output object information such as any coordinate transformation with respect to the model, i.e., object X and Y coordinates, 64, 66, respectively, object angle, scale, or other characteristic, and optionally, a match quality score 68 indicative of the object's ability to meet some geometric standard embodied in the model. The speed and accuracy of the Hough module 60 are directly influenced by the quantity and quality of input object information provided to it. Thus, in a real-time machine vision application, a filtering mechanism is preferable for eliminating spurious and inaccurate object information. The edge filtering system of the invention provides a superior filtering system for producing high quality, low noise Hough input information.

Turning now to the object edge point filtering system 52 of the invention, as stated above, this system accepts edge image magnitude and angle grids 48, 50, produced by, e.g., an edge detection module 34, and reduces the total number of edge points represented in these grids to a manageable level that can be accommodated by subsequent processing modules such as a Hough transform module. In doing so, the edge point filtering system eliminates a large fraction of unwanted, stray, "noisy" edge points generated by noise sources in the object image acquisition process but substantially preserves information bearing edge point information related to the intended edges of the object under consideration. Thus, the object edge point filtering system provides filtering capabilities that reduce the quantity of data to be examined by the machine vision system while at the same time improving the confidence level of the data.

The object edge point filtering system of the invention provides a fast and efficient dual thresholding rule requiring edge point connectivity. Unlike past realizations of dual thresholding techniques, such as the Canny Hysteresis Thresholding method, the dual thresholding system of the invention utilizes a memory stack-driven, flood labeling technique for examining the connectivity relationship between valid edge point pixels and candidate object edge pixels in the object edge magnitude grid. The filtering system of the invention also provides an efficient grid coordinate scanning technique and a grid row exploitative mechanism, for edge point validation labeling, that together with the flood labeling technique, result in superior efficiency, speed, and effectiveness in object edge point filtering over past filtering techniques.

Referring now to FIG. 6, the object edge point filtering system 52 accomplishes a series of modular tasks beginning 80 with input of an edge image grid 48, and optionally, but not necessarily, an edge angle grid 50 (FIG. 2). The object edge image information in these grids is first mapped 82 to coordinate values of a temporary edge map array, hereinafter referred to a work image grid for clarity, described in detail below. Then, memory locations are allocated 84 to construct memory address stacks for the input object edge image information and the output, filtered edge information to be produced. With this preparation complete, the object edge image is then scanned 86 for so-called seed coordinates, those being coordinates having an edge magnitude value greater than a prespecified high threshold magnitude level, as explained in more detail below. The seed coordinates and neighboring coordinates are examined to efficiently confirm edge points in the object image, those confirmed points being flood-fill labeled 88 in an output edge point array, whereby the object edge point filtering is complete 90 for the input edge image grid.

Considering now in more detail the first of the functional modules of the object edge filtering system, namely, the image mapping module 82, this module produces a bounded temporary edge map array or work image grid. The temporary work image grid provides, for each coordinate of the input edge image, a value indicative of the likelihood of that coordinate being an edge point for the object under consideration. The determination of edge point likelihood is based on a dual threshold rule as follows.

Referring back to FIG. 2, a preselected high edge magnitude threshold 53 and a preselected low edge magnitude threshold 55 are input to the object edge point filtering system 52 prior to the start of the filtering operation. The high edge magnitude threshold represents the minimum coordinate value above which a coordinate and corresponding pixel is unconditionally confirmed to be an edge point for the object. In other words, any coordinates in the edge image grid having a magnitude greater than the high edge magnitude threshold are assumed to be edge point coordinates. The low edge magnitude threshold represents the maximum pixel value below which a coordinate is unconditionally confirmed not to be an edge point for the object; that is, any coordinates in the edge image grid having a magnitude less than the low edge magnitude threshold are assumed not to be edge point coordinates. Any coordinates having a value that falls between the low and high edge magnitude thresholds are marked as being questionable candidate edge points.

In one suitable example implementation of this rule, where the coordinate value range of the input edge image is set by 8 binary bits, and therefore has a dynamic range of 0 to 255, the low edge magnitude threshold is set at a value of 10 and the high edge magnitude threshold is set at a value of 25. Other threshold magnitudes can alternatively be employed, as will be recognized by those skilled in the art. Given these magnitude thresholds, one of three edge point indications is assigned to each coordinate in the temporary work image grid, based on the value of the input edge image coordinates, with each coordinate in the input edge magnitude grid corresponding to a coordinate in the work image grid. In an example of three suitable edge point indications, an input coordinate confirmed to be an edge point results in assignment of a VALID_EDGE value of 2 to the corresponding work image grid coordinate, an input pixel confirmed not to be an edge point results in assignment of a NO_EDGE value of 0 to the corresponding work image grid coordinate, and an input coordinate identified as a questionable candidate edge point results in assignment of a POSSIBLE_EDGE value of 1 to the corresponding work image grid coordinate. Other coordinate assignment values could alternatively be employed. Note that like the edge image grid, the work image grid is an array of coordinate values corresponding to pixel locations, but is not itself a pixel array in the sense that it does not represent a physical image, but rather, represents a so-called intrinsic image that provides information about a physical image. Each coordinate in the edge image grid and work image grid corresponds to a pixel in the object image.

Referring to FIG. 7, an example of the input and temporary grid correspondence is illustrated. Given an example input edge image grid 90 having 5 columns and 5 rows, i.e., a 5×5 grid, the image mapping module 82 first defines a work image grid 92 having two additional rows and two additional columns beyond that of the input edge magnitude grid 90. For example, as shown in the figure, a 7×7 work image grid 92 is defined for the 5×5 input edge magnitude grid 90. Coordinates in the area of the work image grid 92 corresponding to the coordinate area of the input grid 90, e.g., the inner 5×5 area in the example, are each set to one of the VALID_EDGE, POSSIBLE_EDGE, or NO_EDGE values based on a comparison between in the corresponding input coordinate value and the high and low threshold values.

Coordinates in the outer-most rows and columns of the work image grid, i.e., rows 1 and 7 and columns 1 and 7, are all set to the NO_EDGE value of 0. This results in an automatic bounding of the work image; such boundary setting is employed to enable the use of flood filling techniques in later modules of the filtering system for producing extremely efficient and fast processing of an input object image. Without addition of this one coordinate-wide (and pixel-wide) work image grid boundary, two extra rows and columns of guard coordinates would be implicitly required of the input edge image grid.

Comparison of the input edge image grid coordinate values with the preset edge magnitude threshold values, and corresponding assignment, or mapping, of values to the work image grid can be accomplished using a wide range of implementation techniques, including a specialized hardware configuration or software code sequence. For example, a digital hardware gate array of gates selected to implement the comparison and assignment logic can be employed, or alternatively, a code sequence corresponding to the following pseudo-code can be used, wherein "Ingrid" refers to the input edge magnitude grid, and the variable "RawMagPixel" refers to the value of a coordinate in the input edge image grid.

---
Work Image Grid Construction And Pixel Mapping:

ASSERT (HIGH_THRESHOLD > LOW_THRESHOLD)
FOR (row_index = 1 to number of rows in Ingrid)
  FOR (col_index = 1 to number of columns in Ingrid)
    IF (RawMagPixel ≥ HIGH_THRESHOLD)
      set mapped pixel value to VALID_EDGE
    ELSE IF (RawMagPixel ≥ LOW_THRESHOLD)
      set mapped pixel value to POSSIBLE_EDGE
    ELSE
      set mapped pixel value to NO_EDGE.
  END for col_index
END for row_index.
---

With this code sequence, the eight-bit image of raw edge magnitudes in the input edge image is converted to a work image containing only the three coordinate states of VALID_EDGE, POSSIBLE_EDGE, and NO_EDGE, with the outermost rows and columns of the image unconditionally set to the NO_EDGE state to act as guard coordinates.

In an alternative mapping technique, a Look Up Table (LUT) is constructed in computer memory based on the high and low magnitude threshold values. As shown in FIG. 8, an example LUT 94 is constructed with a range of possible output assignment values 96 for any possible input coordinate value 98. Based on the example threshold magnitudes given above, and using an 8-bit pixel dynamic range, the LUT defines the work image coordinate assignment value as being 0 (NO_EDGE) for any input coordinate value below the example low magnitude threshold value of 10; the LUT defines the output work image coordinate assignment value as being 1 (POSSIBLE_EDGE) for any input coordinate value between the example low and high magnitude threshold values; and the LUT defines the output work image coordinate assignment value as being 1 (VALID_EDGE) for any input coordinate value greater than the high magnitude threshold value. With this construction, the LUT is employed to map an input edge image grid to a work image grid using, e.g., a code sequence corresponding to the following LUT mapping pseudo-code, wherein "Ingrid" refers to the input edge magnitude grid.

---
LUT Work Image Grid Mapping:

FOR (row_index = 1 to number of rows in Ingrid)
  FOR (col_index = 1 to number of columns in Ingrid)
    DEST[row_index+1, col_index+1]=
      LUT[Ingrid[row_index, col_index]]
  END for col_index
END for row_index.
---

This method has advantages over the mapping code sequence discussed above in that the LUT mapping eliminates an evaluation of multiple conditionals required in the innermost mapping loop of that earlier code sequence.

In the next filtering system module, namely, the address stack allocation module 84 (FIG. 6) two synchronized address stacks, one corresponding to the work image grid and the other corresponding to an output edge point array produced by the filtering system are constructed in computer memory to control a sequence of coordinate connectivity inquiries for the work image grid coordinates marked in the POSSIBLE_EDGE state as questionable candidate object edge points. Such coordinate connectivity inquiries are employed in accordance with the invention as an edge connectivity metric for filtering out questionable candidate edge points that likely are not true object edge points.

This metric is based on a rule requiring that a questionable candidate edge coordinate be considered a true object edge coordinate only if that edge point directly neighbors a coordinate having an edge magnitude value greater than the high threshold value or if a connected path can be traced from that questionable coordinate through one or more questionable coordinates to a coordinate having an edge magnitude value greater than the high threshold magnitude value. In other words, any questionable coordinates neighboring or in an unbroken path originating at a confirmed edge coordinate are themselves confirmed as edge coordinates. A spatial constraint is thereby imposed by the connectivity rule on questionable candidate edge coordinates to filter out any questionable coordinates that are not connected to previously validated edge coordinates. This constraint is based on an assumption that of all coordinates having an edge magnitude less than the high edge magnitude threshold, those that are part of the intended object image will have a spatial connection to stronger and true edge coordinates while those that are due to random noise will not have such a spatial connection. Thus, the connectivity constraint enables effective recovery of weak object image signals, in, e.g., a low contrast object environment, without necessarily introducing a large number of stray "noise" edge signals at the same time.

The edge point filtering system of the invention provides a superior implementation of this connectivity constraint to achieve a level of edge point filtering efficiency and speed that unlike prior edge filtering systems, can satisfy the high-speed requirements of real-time vision system applications. The synergy of the system's features that enable this advantage will be apparent from the implementation description below.

The address stack allocation module of the filtering system constructs, as mentioned above, two address stacks, one for the temporary work image pixel grid 92 (FIG. 7) and one for an output edge point array, or grid, constructed by the filtering system. As explained below, outputs other than or in addition to such a grid can be produced by the system; these will be described later in the discussion. In the case of an output edge point grid, each coordinate in the grid is assigned, by the process described below, a value of either 0,corresponding to the state NO_EDGE, or a value 2, corresponding to the state VALID_EDGE. The edge filtering system thereby functions as a filter such that an input object image of 8-bit pixel edge magnitudes is mapped to an output image in which each output coordinate has one of only two possible values, a first value indicating that the corresponding input pixel is not to be considered an edge point for the object, or a second value indicating that the corresponding input pixel is to be considered an edge point for the object.

The work image and output edge point address stacks are constructed in accordance with the invention to control the valid edge coordinate connectivity inquiry as the entire work image grid is examined during the inquiry. Accordingly, the addresses stored in each of the two stacks are the computer memory addresses of coordinates in the grid corresponding to that stack as the work image grid is gridined and the output edge grid is constructed. In other words, memory addresses of values of coordinates to be examined or labeled are stored in the stacks as the connectivity inquiry proceeds. Conventional stack protocol can be employed in defining the address stacks. Preferably, the two stacks are initialized to be of the same size and this initial size is preferably set equal to the largest stack size that could be required, defined as that stack size that could accommodate the total number of addresses for coordinates could be found valid during the entire grid connectivity inquiry.

This stack size initialization provides superior efficiency for the connectivity inquiry. Specifically, with such an initialized stack size, no subsequent stack size expansion checks are required as additional pixel addresses are pushed on the stack during the connectivity inquiry. As a result, a substantial amount of overhead processing is eliminated from the connectivity inquiry. The particular impact of this stack size initialization on the efficiency of the filtering system will be more evident with the implementation description that follows.

The initialization stack size is set based on a number of criteria, including the amount of memory available for allocation of the two stacks. If memory is largely available, then memory-intensive stack allocation can be accommodated, wherein it is assumed that each and every coordinate of the work image grid may be a valid object edge point; with this assumption, the stack size is set based on the total number of coordinates in the input object image. This can be ascertained using, e.g., a code sequence applied to the input edge magnitude grid, based on the following pseudo-code sequence, wherein "Ingrid" refers to the input edge magnitude grid and IMG refers to the image in the magnitude grid.

Stack Size Computation (Memory Intensive)

Stacksize=((Ingrid_IMG.width*Ingrid_IMG.height)+1) *memory address size For a 256×256 image, and 4-byte memory addresses, the initial stack allocation memory requirement for the two address stacks is given by this code as (256*256+1)*2*4=524 Kbytes. The additional 1 stack location included in this calculation for each of the two stacks corresponds to a first holding entry in the stacks, as explained in more detail below.

If memory cannot be so loosely allocated, a more conservative initial stack size can be computed by, e.g., determining the number of coordinates in the work image grid for which either the VALID_EDGE or POSSIBLE_EDGE states have been assigned. This eliminates from the stack size the number of input coordinates which were initially ascertained to not be edge points. Such a determination can be obtained, for example, either as a side task during the pixel mapping performed by the image mapping module 82 (FIG. 6) or subsequently by computing a histogram of the mapped image in the work image grid. In either case, the initial stack size can be determined with code implementing the following pseudo-code sequence.

Stack Size Computation (Memory Efficient)

Stacksize=(ValidEdgeCount+PossibleEdgeCount+1) *memory address size. For an image containing, e.g., 10,000 coordinates designated as valid object edge points and, e.g., 5,000 coordinates designated as possible object edge points, and given a 4-byte memory address size, the initial stack allocation memory requirement for the two address stacks is given by this code as (10,000+5,000+1)*2*4=120 Kbytes. Based on the efficiency with which this latter stack size computation allocates memory for the address stacks, it is seen to be preferable over the memory intensive version for many applications.

Rather than directly counting the number of valid and possible object edge points in the work image grid, the LUT-based mapping procedure discussed above can be modified to directly provide this count. This technique eliminates the need to rescan the work image grid in a separate histogramming step. Instead, a histogram is produced as the LUT is called. In one suitable example LUT-based histogram technique, a code sequence produces the edge point histogram based on, e.g., the following pseudocode sequence, in which "Ingrid" refers to the input edge magnitude grid.

---

LUT-Based Valid and Possible Edge Point Histogram:

DECLARE HIST [3]
HIST[0] = 0
HIST[1] = 0
HIST[2] = 0
FOR (row_index = 1 to number of rows of Ingrid image)
    FOR (col_index = 1 to number of columns of Ingrid image)
        INDEX = LUT[Ingrid[row_index, col_index]]
        DEST[row_index+1, col_index+1] = INDEX
        HIST[INDEX] = HIST[INDEX] + 1
    END FOR col_index
END FOR row_index
STACKSIZE = HIST[1] + HIST[2].

---

Figure 9A:
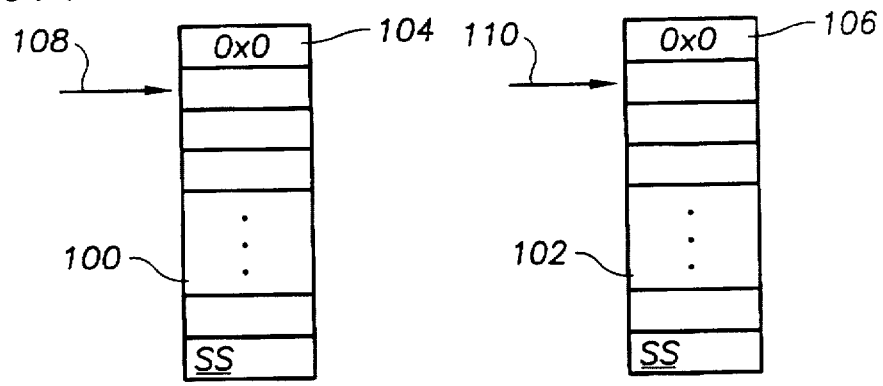
FIG. 9A is a diagram of a work image memory address stack and an output edge point memory address stack employed by the object edge point filtering module of the invention for producing an output edge point array.

Referring to FIG. 9A, whatever technique is employed to select a stack size, the stack allocation module constructs two stacks, a work image address stack 100 and an output edge point address stack 102. Each of the two stacks is allocated space in computer memory sufficient for a number of entries equal to the selected stack size, SS. The initial entry 104, 106 on each of the stacks is set to NULL; it is not necessary to initialize the other contents of the stack to any particular value. Finally, the stack entry pointer 108, 110 for each of the stacks is initialized to point to the second entry in the stack. The two stacks are specified to be synchronized in the sense that corresponding coordinate addresses of the work image grid and the output edge image grid to be constructed occupy the same relative position in their respective stacks as the questionable candidate edge coordinate inquiry proceeds.

Figure 9B:
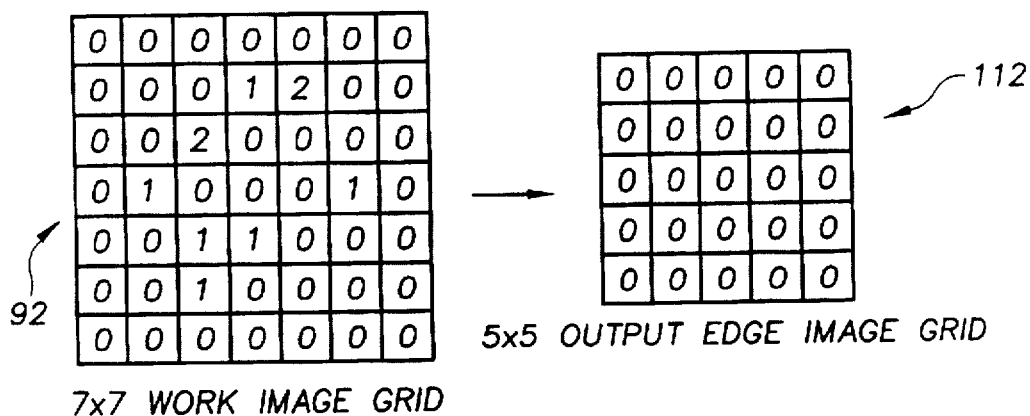
FIG. 9B is a diagram of an initialized example output edge point array, the coordinate values of which are determined based on the example work image grid of FIG. 7.

The output edge point grid to be constructed is initialized by the stack allocation module. Referring to FIG. 9B, the size of the output edge point grid 112 is set equal to that of the input edge magnitude grid (FIG. 7). Accordingly, if, for example, as shown in FIG. 9B, the work image grid 92 is a 7×7 grid including a guard border of pixels, then the output edge image grid 112 is set at 5×5, i.e., two less column and two less rows than the work image grid to correspond to the input edge magnitude grid.

The next filtering system module, the seed coordinate scan module 86 (FIG. 6) initiates a scan of the work image grid for any coordinates having a value indicative of a confirmed object edge point. In the example being considered, any such VALID_EDGE coordinates have a value of 2. Recall that the connectivity edge point constraint implemented by the filtering system requires that those coordinates in the work image grid having a value indicative of a possible edge point, i.e., having the POSSIBLE_EDGE value of 1, can be confirmed as a true object edge point only if those coordinates are connected to coordinates having the VALID_EDGE value of 2. Accordingly, coordinates with the VALID_EDGE value are employed by the threshold system as starting or "seed" points for the examination and labeling of neighboring coordinates to determine if any of those neighboring coordinates that are POSSBILE_EDGE pixels; if found, any such neighboring coordinates satisfy the connectivity constraint.

The definition of connectivity can be selected based on the degree of edge point filtering desired from the filtering system. In a preferred definition, called eight-connectedness (8-C), a possible edge point coordinate (and its corresponding pixel) is considered to be connected to a valid edge point coordinate if any one or more of the 8 coordinates directly surrounding the possible edge point coordinate are themselves a valid edge point coordinate. In an alternative definition, called four-connectedness (4-C), a possible edge point coordinate is considered to be connected to a valid edge point coordinate if any one or more of the 4 coordinates adjacent to the possible edge coordinate that together with that coordinate form a cross geometry are themselves a valid edge point coordinate. In a second four-connectedness rule, one or more of the 4 coordinates that together with a possible edge point coordinate form an "x" geometry are valid edge point coordinates. Eight-connectedness is preferred as the more accurate and appropriate definition for use with the dual thresholding rule implemented by the invention, but as will be recognized by those skilled in the art, one of the four-connectedness rules or another connectedness rule can alternatively be employed.

In the seed coordinate scan operation, the value of each coordinate in the work image grid is examined in sequence to identify the first valid edge coordinate. The filtering system of the invention provides a particularly fast and efficient technique for completing the scan in a manner that addresses one of the common processing bottle necks in typical machine vision systems, that of image coordinate fetching from external memory into a central processing unit (CPU). Typically, an external memory section in which a grid of coordinate values is stored is accessed by a machine vision system once for each coordinate in the grid to be examined. In the case of machine vision edge processing, many of the coordinates in a grid are characterized by no activity, and the access and examination time for each such coordinate results in a slow-down of the overall edge processing functionality.

In the invention, this inefficiency is diminished using a format in which coordinate values of an edge image are each allocated one byte of memory, and the coordinates in the edge image are organized in memory such that adjacent coordinates along a row of the image occupy consecutive memory addresses. This memory address configuration is embodied in the regular image addressing format described earlier and shown in FIG. 3. Recall that this format does indeed provide that values of coordinates along the same row of an image are located in consecutive memory locations and the difference in addresses between coordinates in a given column and adjacent rows is a constant, even if the rows within the grid are not stored sequentially; i.e., the row address difference is a constant but not necessarily equal to the number of columns.

With this coordinate address configuration, multiple coordinate values can be read from external memory during a single memory access cycle, as opposed to a separate memory access cycles for each coordinate, because the CPU is guaranteed of the preset regular image formatting that defines a neighboring relationship between the accessed multiple coordinates. Once multiple neighboring coordinate values are accessed, a processing unit can handle the multiple coordinates as a group. In one example implementation in accordance with the invention, the filtering system includes a 32-bit data bus and a CPU for which eight-bit coordinate values can be fetched from memory in packets of four coordinate values per packet. With this configuration, the seed coordinate scan operation proceeds by first accessing the first four coordinate values of the work image grid as a single packet and then examining the packet to ascertain if any of the accessed coordinate values is a 2, indicating a valid edge coordinate. If an edge coordinate is identified in the packet, the flood label module 88 (FIG. 6) then proceeds with the connectivity inquiry, as described below. If, however, no valid edge coordinate is identified in the first packet of coordinate values, then the next sequential packet of coordinate values is accessed, an so on, until a first valid edge coordinate is located. Other coordinate packet accessing schemes can be employed in accordance with the invention: for a given data bus width and CPU fetching capability, coordinates are grouped in sequence to maximize the number of coordinate values that can be fetched with one memory access. The use of a regular image format is preferable to enable predictable CPU performance for the packet fetch operation.

The seed coordinate inquiry can be implemented particularly efficiently with, e.g., a Motorola CPU, which provides the capability to make a comparison with the value 0 very quickly. In this case, a packet of coordinate values is efficiently scanned for a seed coordinate by comparing the coordinate values with the value 0, and for those coordinate values not matching 0, next comparing them with the value 1, indicative of a possible edge coordinate. Those coordinates whose values does not match either the compared 1 or 0 values are then indicated as having a value 2, i.e., marked as valid edge coordinates that can be used as seeds for the connectivity inquiry.

The flood filling module of the filtering system implements a coordinate connectivity inquiry for the work grid image with particular speed and efficiency, in part due to the flood filling technique, which is a stack-driven scheme for marking adjacent coordinates that satisfy some merging criteria. Flood filling has been used conventionally for, e.g., computer graphics applications such as image coloring. This is described in, e.g., *Computer Graphics*, by D. Hearn and M. P. Baker, Prentice-Hall, Engl. Cliffs, N.J., 1986, pp. 92-95, and in "Filling Algorithms for Raster Graphics," by T. Pavlidis, in SIGGRAPH 1978 Proc., *Comp. Graphics*, Vol. 12, No. 3, pp. 161-166. In the invention, flood filling capability is extended from a single image-single stack implementation to multiple images and multiple stacks.

This flood filling implementation is applied in the invention to a connectivity inquiry wherein the eight neighboring coordinates of any identified valid edge coordinates are examined to determine if any of those neighboring coordinates are themselves valid edge coordinates or questionable candidate edge coordinates. Any such valid edge coordinates and questionable candidate edge coordinates are marked as themselves being valid edge coordinates in accordance with the eight-connectedness constraint described above. This is in stark contrast with prior connectivity inquiry rules in which questionable candidate edge coordinates, rather than valid edge coordinates, are employed as seed points for connectivity inquiries. In those cases, neighboring coordinates of a questionable candidate coordinate are traversed and examined in an effort to validate the questionable coordinate's validity. But it is possible that all neighboring coordinates of a questionable candidate edge coordinate could be examined without encountering a valid edge coordinate, in which case the neighboring coordinate traversal and examination was unnecessary and wasted processing time. This inefficiency is eliminated in the invention by examining neighboring coordinates of only valid edge coordinates, not questionable candidate coordinates. In this technique, any neighboring coordinates that are of a state other than invalid can be immediately identified as valid edge coordinates due to the fact that they neighbor a valid edge coordinate. As a result, the filtering system of the invention achieves superior efficiency and speed over prior connectivity-based filtering systems.

This connectivity inquiry is carried out for all valid edge seed coordinates in the work image grid by the flood filling module of the filtering system working in cooperation with the seed coordinate scanning module. In one suitable example implementation in accordance with the invention, the initial seed coordinate scan, flood filling operations, and follow-up seed coordinate scans are controlled with a code module that enables, e.g., the following pseudo-code sequence.

---

Seed Coordinate Scan and Coordinate Connectivity Inquiry Sequence:

```
SCAN WORK IMAGE GRID FOR SEED COORDINATE
    IF FOUND
        Push (seed coordinate address in work
        and output edge stacks)
            DO FILL
                POP (Seed coordinate address from
                work image and output image stacks)
                MARK (coordinate location in work
                image as INVALID_EDGE)
                MARK (coordinate location in output
                image as VALID_EDGE)
                WHILE (coordinate address !=NULL) DO
                    LOOP OVER NEIGHBORING
                    COORDINATES (8-C sense)
                        IF (Current neighbor
                        coordinate =VALID_EDGE or
                        POSSIBLE_EDGE)
                            PUSH (addresses of current neighbor
                            coordinate)
                            MARK coordinate location in work
                            image as INVALID_EDGE
                            MARK coordinate location in output
                            image as VALID_EDGE
                        ELSE
                            CONTINUE
                        ENDIF
                    END LOOP
                    POP (next coordinate addresses)
                END WHILE
            END FILL
    ELSE
        CONTINUE
    END IF
END SEED COORDINATE SCAN.
```

---

Referring to FIGS. 10A–10D, the sequence of functions enabled by this code sequence is illustrated for an example work image grid 92 that resulted from the coordinate mapping operation on an example input edge magnitude grid 90 (FIG. 7). For clarity, the hexadecimal address of the first coordinate in each row of coordinates for the two grids is labeled; note that these are example addresses only and that there is no requirement for a specific range of addresses or relationship between the work image coordinate grid addresses and the output edge point grid addresses.

As shown in FIG. 10A, the first entry of each of the work image and output edge point stacks, 100, 102, respectively, is initialized to 0 and all of the coordinates in the output edge point grid 112 are initialized to 0. Note also that both the work image stack 100 and the output edge point stack 102 are initialized to the same size, that size corresponding to the largest possible number of valid edge coordinates in the work image. In the example shown, there is a total of eight valid and questionable candidate edge coordinates in the work image grid; accordingly, the stacks are set to include eight entries beyond the first null entry. The entry pointer for the two stacks is initialized to the same entry in each of the stacks to preserve synchrony between the stacks.

In the first SCAN operation of the sequence, the work image grid 92 is scanned for a first valid edge coordinate; this seed coordinate is found to be the coordinate having the address 0x24. Then in the first IF consideration, the address of this valid edge coordinate is pushed on the work image stack 100 and the address for the corresponding coordinate in the output edge point is pushed on the output edge point stack 102. The sequence then proceeds with the FILL loop, in which the coordinate addresses are first popped off the stacks. Then the value of the seed coordinate is marked with the value 0, corresponding to INVALID_EDGE, in the work image grid, and the value of the corresponding coordinate in the output edge point grid is marked with the value 2, corresponding to VALID_EDGE, as shown in FIG. 10B. The seed coordinate in the work image grid is set to 0 to eliminate a redundant neighbor pixel scan for that coordinate in later calls of the loop, as will be appreciated with the following discussion.

Figure 10C:
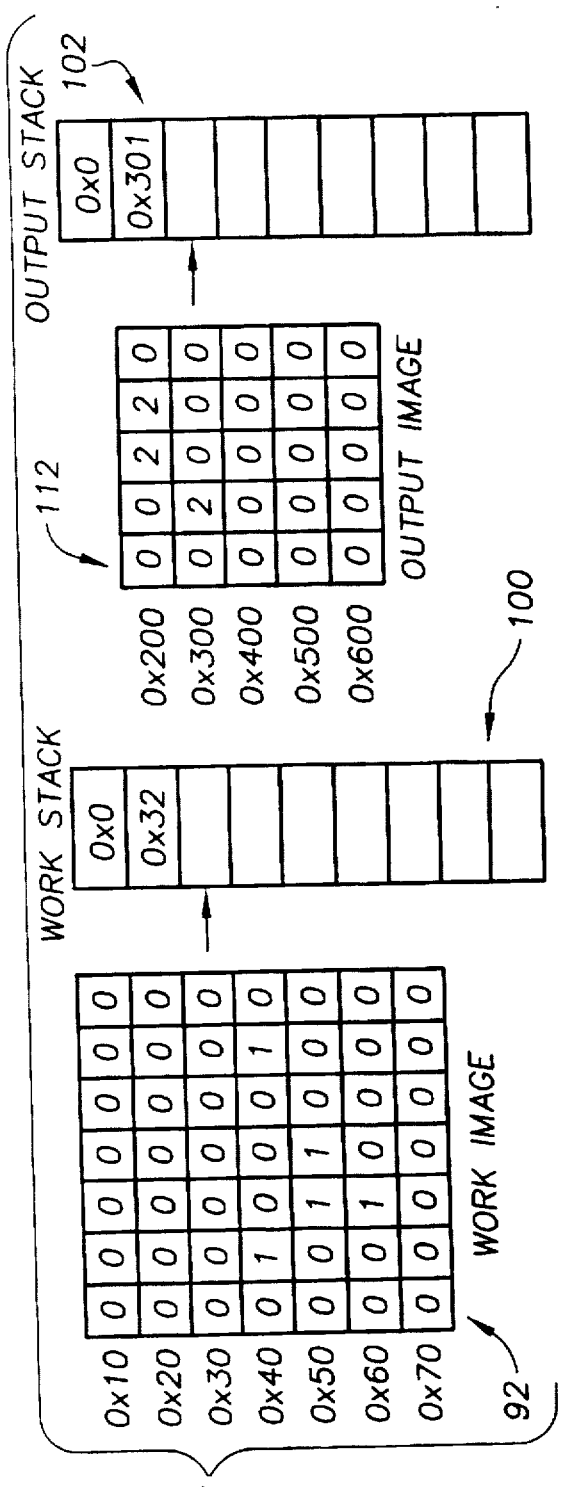

Next a first connectivity inquiry is initiated with the neighboring coordinate WHILE LOOP to look for any valid edge coordinates or questionable candidate edge coordinates surrounding the first identified seed coordinate in the work image grid. This results in the identification of a questionable candidate coordinate located at address 0x23. Accordingly, under the IF consideration, that address is pushed on the work image stack 100 and the corresponding coordinate address is pushed on the output edge point stack 102. Then the value of that questionable candidate coordinate is marked with the value 0, corresponding to INVALID_EDGE, in the work image grid, as shown in FIG. 10B. The value of the corresponding coordinate in the output edge point grid is marked with the value 2, corresponding to VALID_EDGE, as shown in FIG. 10C.

Once all of the coordinates surrounding the first seed coordinate are examined, the neighboring coordinate LOOP is complete and the next coordinate address is popped off the stacks; this is the address of the first confirmed candidate edge coordinate located in the previous pass of the neighboring coordinate LOOP. A neighboring coordinate LOOP pass is then undertaken for this coordinate; a verified edge coordinate is thereafter located at address 0x32 in the work image grid, resulting in marking of that coordinate to the state INVALID_EDGE, in the work image grid, as shown in FIG. 10C, and marking of the corresponding coordinate in the output edge point grid to the state VALID_EDGE. The sequence is continued in this manner, with the address of each verified or questionable coordinate in the work image grid being pushed onto the work image stack when such a coordinate is encountered during a connectivity inquiry, and resulting in an additional connectivity inquiry when the address is later popped off the stack.

Figure 10D:
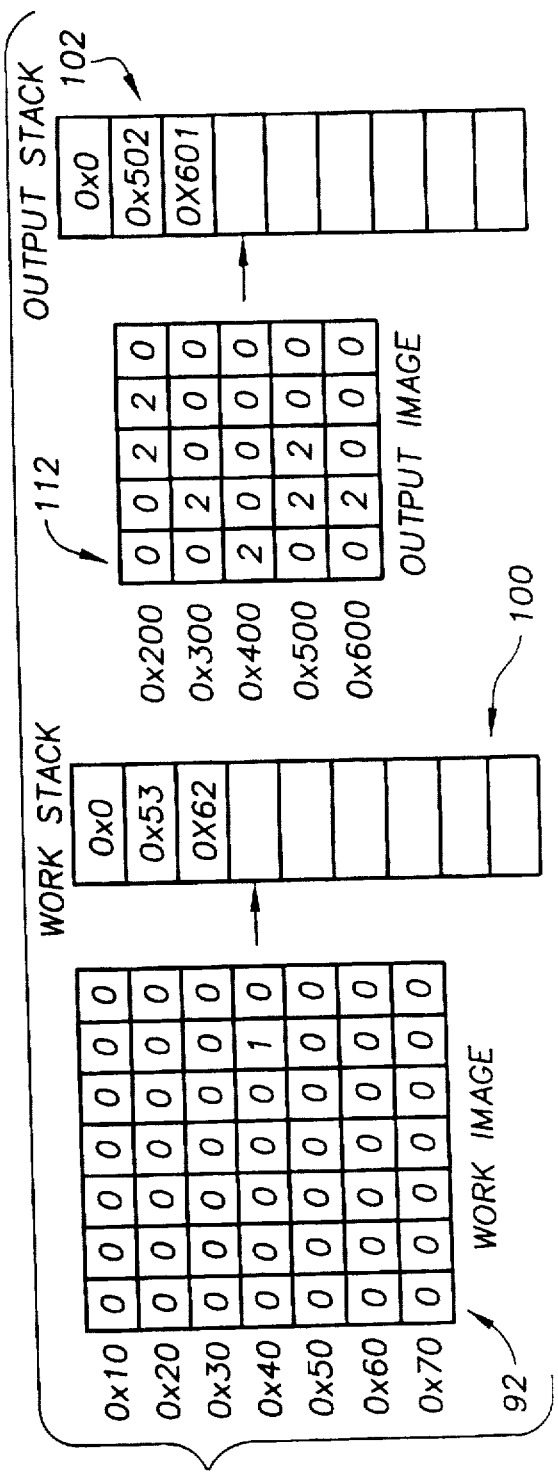

With this procedure, each instance of a connectivity inquiry for the work image grid is data driven, i.e., is undertaken as the result of confirmation of an additional verified edge coordinate, and further, each connectivity inquiry surrounds a verified edge coordinate. As stated above, this eliminates the possibility of a wasted neighboring coordinate LOOP. Once the entire work image grid has been examined, as is shown in FIG. 10D, and as is assured by the inner neighboring LOOP and outer SCAN LOOP, then all verified edge coordinate addresses have been popped off of the stack and the pointer will indicate the null entry. This signifies the end of the inquiry and completion of the output image grid 112. Note in FIGS. 10A and 10D that for the example work image grid, the filtering system filters out one of the questionable candidate edge points to produce an output edge point grid having a total of seven object edge coordinates. Comparing this output image with the example input edge magnitude grid 90 of FIG. 7, it is seen that overall the filtering system filtered out 12 of 19 possible object edge coordinates.

This effective coordinate filtering is achieved and with high speed and efficiency, as explained above. Many features of the system work synergistically to produce this efficiency. First, the synchronism of the work image and output edge image stacks provides a mechanism for automatically keeping track of the state of connectivity inquiries and coordinate value marking in the work image and output edge image grids. As part of this synchrony, initial sizing of both the stacks to a worst case size eliminates the need for intermediate checking to determine if a stack expansion is necessary; this initial sizing in effect bounds the computation. Similarly, the outer guard ring of NO_EDGE coordinates in the work image grid enables the content of the coordinate data in the work image to bound the computation. No boundary checking of any kind is required during each connectivity inquiry with respect to the image dimensions. Elimination of boundary checking with respect to both the image dimensions and the address stacks size enables achievement of optimal speed for the filtering functionality. Without these two efficiency factors, multiple conditional checks would be required as each coordinate is examined during each connectivity inquiry and as each coordinate address is pushed on a stack.

It must be noted, however, that for some applications, one or more of these specific features may not be necessary, and thus they are not in combination absolute requirements of the invention. For example, the coordinate address stack sizes could alternatively be initialized to only the number of valid edge coordinates identified in the work image grid. In this case, after a number of coordinate address push operations, a check for the need for additional stack entries would be required. Such a conditional check, while slowing down the edge point filtering process, would not impair the filtering accuracy; in the case of no stack size initialization at all, a significant degradation in filtering speed would need to be accommodated.

The flood filling sequence just presented, while providing superior performance over prior edge point filtering systems, is limited in that only one coordinate value and corresponding stack address can be marked as a confirmed object edge coordinate per iteration of the inner sequence loop. But in some applications, the work image and output edge point address stacks may be rather large data structures resident in external memory; in such cases each coordinate address push and pop operation requires relatively excessive processing resources. In an alternative example embodiment of the seed scan and flood filling modules of the filtering system, the number of stack push/pop cycles is reduced to further improve efficiency and speed of the operations.

This is accomplished in the invention by adapting the computation such that all coordinate values to be marked in the work image and the output edge point grids that reside along a single row are marked in a single iteration of the inner coordinate stack loop. The regular image format of coordinate value storage enables such row marking. This is an improvement over the implementation described above because marking of coordinates in this manner eliminates the need for multiple stack pushes and corresponding external memory references per row of coordinates.

Figure 11:
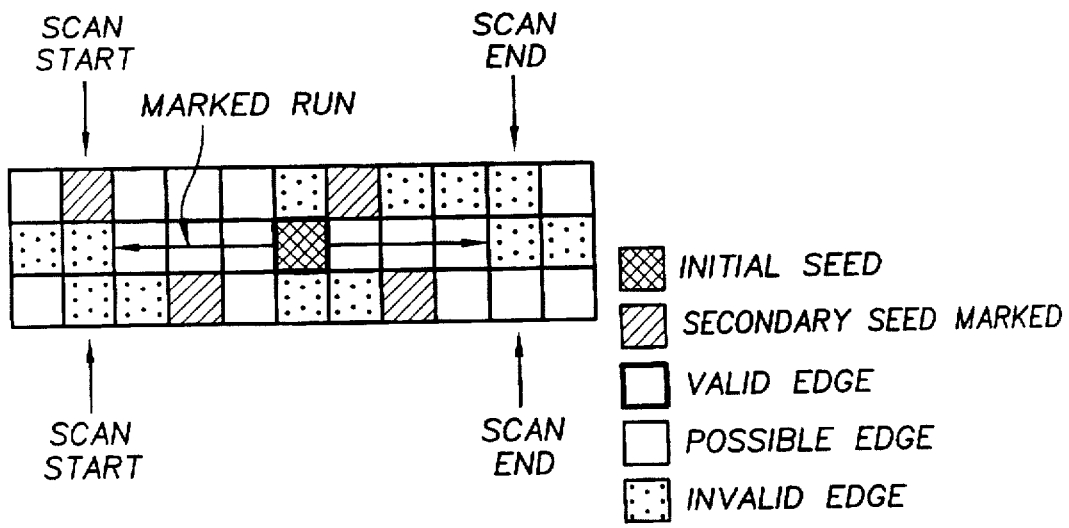
FIG. 11 is a diagram of a portion of an example work image grid illustrating a second sequence of operations for determining the coordinate values of the output edge point array in accordance with the invention.

Referring to FIG. 11, an example of the row marking technique is illustrated for a subset of coordinates in an example work image grid. In the technique, once an initial VALID_EDGE seed coordinate is identified, any POSSIBLE_EDGE or VALID_EDGE coordinates falling in sequence with the seed coordinate in the same row are immediately marked in the work and output edge images without pushing these coordinates' addresses on the stacks, instead of examining the eight neighbors connected the seed coordinate, as was done in the previous technique. Next, the row just above and just below the row of the marked run are examined for the connectivity constraint. This examination is accomplished in a given row starting with the coordinate whose address is one less than the leftmost coordinate in the marked run and ending with the coordinate whose address is one greater than the rightmost coordinate in the marked run. In the example, the marked run is seven coordinates long; accordingly, a sequence of nine coordinates in the row above and the row below are examined. This sequence expansion corresponds to the eight-connectedness coordinate connectivity constraint imposed by the filtering system and results in a complete check on connectivity for each of the coordinates in the center row run in which the seed coordinate was identified.

Recall that for this connectivity inquiry, each of the coordinates in the above and below row sequences is to be examined for a value greater than the INVALID_EDGE value. The address of a coordinate meeting this criteria is pushed on the work image and output edge image stacks only if that coordinate was the first coordinate in the scan or if one or more coordinates of the value INVALID_EDGE are encountered in the scan between coordinates of a value greater than INVALID_EDGE. For example, as shown in FIG. 11, for the row above the initial marked run, the first examined coordinate is identified as a possible edge, and being the first coordinate in the run, its address is pushed on the stacks, thereby marking it as a secondary seed. Then the next three coordinates are identified as possible edges, but their addresses do not need to be pushed on the stack. After encountering a coordinate of the value INVALID_EDGE, the next coordinate is identified as a possible edge, and being a coordinate falling after an INVALID_EDGE, its address is pushed on the stacks, thereby marking it as a secondary seed. The same process is followed for the row below the marked run. In the example, seven coordinates are marked as edge points and four secondary seed coordinate addresses are pushed on the stacks. The added efficiencies of this technique are apparent from the example; more than one coordinate is confirmed as an object edge point for each address push on the work image and output edge image stacks.

One suitable example implementation of this row-exploitative connectivity inquiry is prescribed by the following pseudo-code sequence.

Row-Exploitative Seed Scan and Coordinate Connectivity Inquiry Sequence:

SCAN FILL IMAGE FOR SEED COORDINATE
  IF FOUND
    PUSH (seed coordinate address in work image and output image stacks)
    FLOOD MARK LOOP
      POP (seed coordinate address from work image and output image stacks)
      MARK (coordinate at current address in work image as INVALID_EDGE)
      MARK (coordinate at current address in output image as VALID_EDGE)
      WHILE (current work image coordinate address !=NULL) DO
REMARK: Mark coordinates starting at seed address/moving right along row
        run_length = 1
        XA = work image coordinate address + 1
        XB = output edge image coordinate address + 1
        WHILE {work_image [XA]!= INVALID_EDGE}
          work_image [XA] = INVALID_EDGE
          output edge_image [XA] = VALID_EDGE
          XA = XA + 1

XB = XB + 1
          run_length = run_length + 1
        END WHILE
REMARK: Mark coordinates starting at seed address/moving left along row
        XA = work image coordinate address – 1
        XB = output edge image coordinate address – 1
        WHILE {work_image |XA| != INVALID_EDGE}
          work_image |XA| = INVALID_EDGE
          output edge_image |XA| = VALID_EDGE
          XA = XA – 1
          XB = XB – 1
          run_length = run_length + 1
        END WHILE
REMARK: Now check coordinates above/below those just marked for new seeds
        FOR (I = to run_length + 2)
          PUSH (Eligible coordinate addresses)
        END FOR I
        FOR (I = 0 to run_length + 2)
          PUSH (Eligible coordinate addresses)
        END FOR I
      END WHILE
    END FLOOD LABEL LOOP
  ELSE
    CONTINUE
  END IF
END SEED COORDINATE SCAN.

Figure 12C:
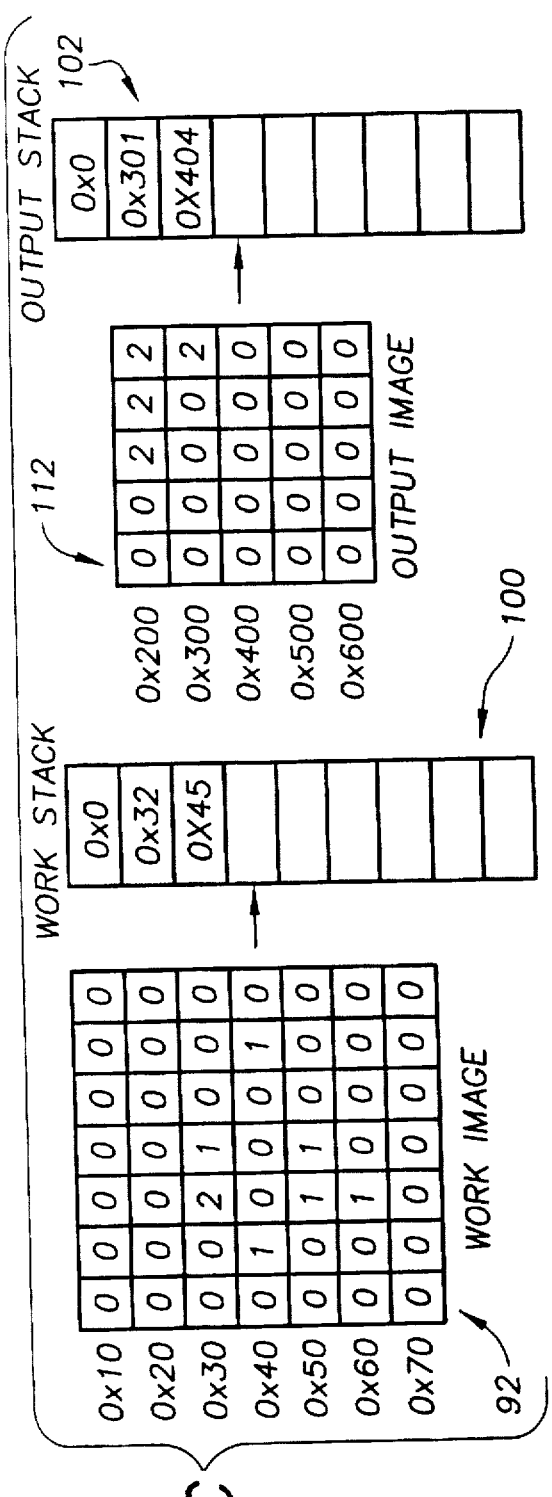
Figure 12D:
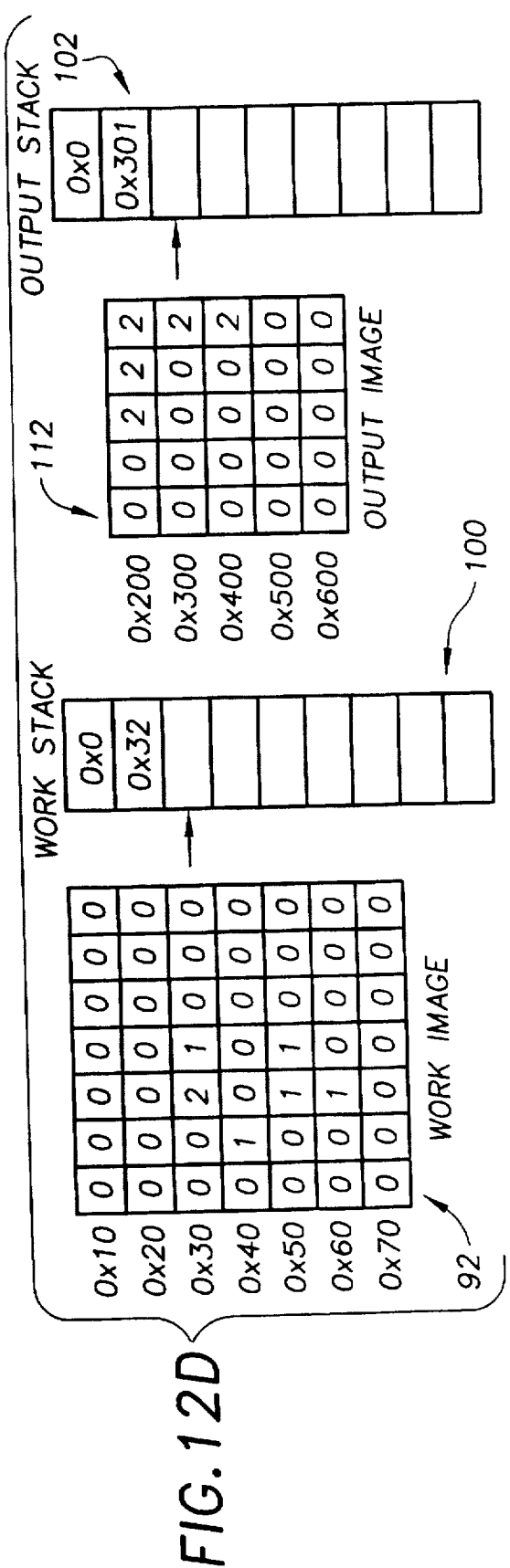
Figure 12E:
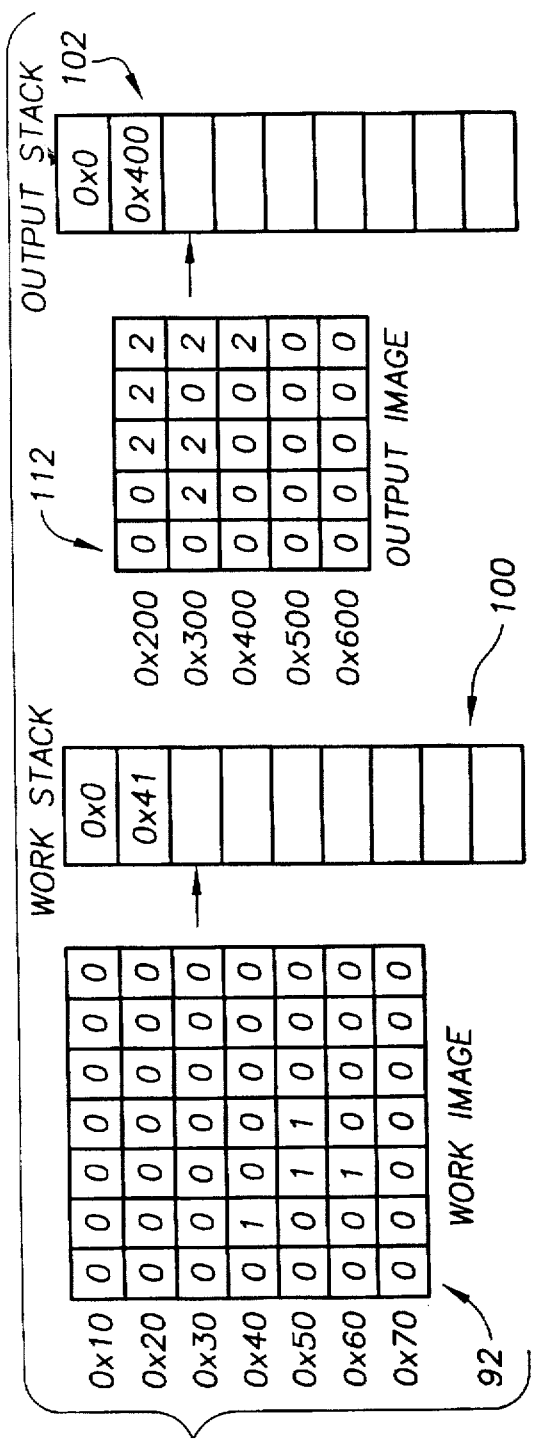
Figure 12F:
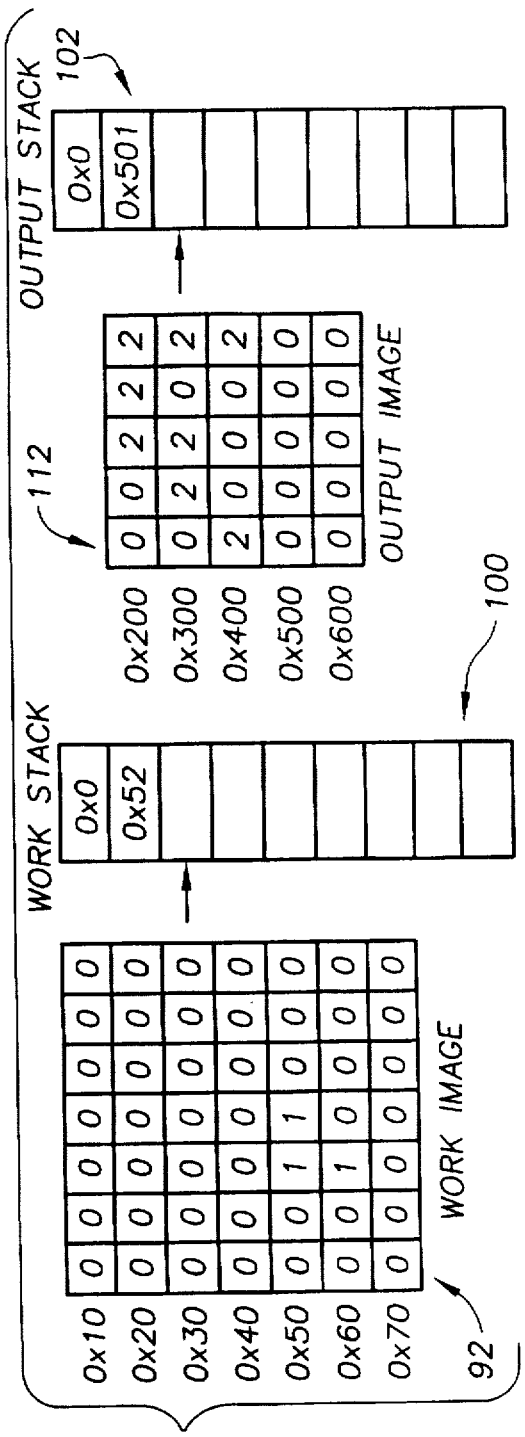

Referring to FIGS. 12A–12H, the sequence of functions enabled by this code sequence is illustrated for an example work image grid 92. As in FIG. 10, the hexadecimal address of the first coordinate in each row of coordinates for the two grids is labeled for clarity. As shown in FIG. 12A, the first entry of each of the work image and output edge point stacks, 100, 102, respectively, is initialized to 0 and all of the coordinates in the output edge point grid 112 are initialed to the INVALID_EDGE value of 0. Note also that the work image stack and the output edge point stack are initialized to the same size—only nine of the twelve stack entries are illustrated.

In the first SCAN operation of the sequence, the work image grid 92 is scanned for a first valid edge coordinate; this seed coordinate is found at the address 0x24. Then the address of this valid edge coordinate is pushed on the work image stack 100 and the address for the corresponding coordinate in the output edge point grid is pushed on the output edge point stack 102. The sequence proceeds with the FLOOD LOOP by popping the seed coordinate address and marking of any edge coordinates in the same row as that address. Both the coordinate before and the coordinate after the seed coordinate are of the value 1, the POSSIBLE_EDGE value, and thus they are marked with the value 0 as INVALID_EDGEs (eliminating later redundancy), and the corresponding coordinates in the output edge point grid are marked as confirmed edge points with the value 2, as shown in FIG. 12B.

Next, the coordinates in the row above and the row below the three-coordinate string just marked are examined. The coordinate scan in each of these rows is five coordinates long, or one coordinate longer at the beginning and end of the sequence than the marked run. No possible edge point or valid edge point coordinates are identified for the upper row, but in the lower row, the first coordinate examined is a valid edge coordinate, as is the next adjacent coordinate. The first coordinate's address is therefore pushed on the stacks, but the second address is not. The next coordinate is found to be of the value 0, or INVALID_EDGE, while the following coordinate is of the value 1, or POSSIBLE_EDGE. The address of this last coordinate, 0x35, is pushed on the stacks, as shown in FIG. 12B, because it follows an INVALID_

EDGE. The final coordinate in the sequence is found to be an INVALID_EDGE.

Having completed the upper and lower row examination, LOOP continues as the last address, 0x35, is popped off the stacks, and the coordinates to the right and left of this coordinate are examined; neither is a possible or valid edge and thus no run of marked coordinates is possible for this row. Accordingly, only the seed coordinate is marked, as shown in FIG. 12C, in the work image and output edge point image. Next, an upper and lower row examination of 3-coordinates wide is undertaken, identifying no possible or valid edge coordinates in the upper row but one in the lower row at address 0x40. This coordinate address is pushed on the stacks, as shown in FIG. 12C.

The sequence loop of coordinate examination in the seed row, followed by examination of coordinates in the row just above and just below the seed row continues in this manner, as shown in FIGS. 12D–12G, until, as shown in FIG. 12H, the entire work image grid has been examined. In this example, all of the possible edge coordinates were found to be confirmed as edge coordinates, whereby no coordinates were filtered out during the row exploitative connectivity inquiry. For cases such as this the speed and efficiency of the connectivity inquiry is particularly advantageous, given that no filtering resulted from the inquiry and all possible edge coordinates were confirmed to be valid edge coordinates.

As will be recognized by those skilled in the art, other connectivity inquiry implementations are suitable for the stack-based flood-fill technique provided by the invention. The invention accordingly contemplates implementation of the inquiry in any method suitable for a given application that accommodates the stack-based flood-filling approach.

Referring now back to FIG. 2, whichever inquiry technique is employed, the object edge point filtering system of the invention 52 outputs to, e.g., an object matching module 60 edge information such as filtered edge magnitudes 54, filtered edge angles 56, and/or a filtered edge count 58. This information can take many forms. For example, the filtered edge magnitude information can be provided as a template of edge points for comparison with an original image by, e.g., a digital ANDing process. The edge count can be provided as, e.g., a list of edge addresses, a histogram of edge points, or other coordinated listing for processing by, an object matching module 60. The filtered angle information can be provided as, e.g., a template of edge point angles or list of the addresses of angles of the filtered edge points.

In one example edge point angle reporting technique, the filtering system or other additional processing module computes the lines along which each of the filtered edge point pixels lie and reports the angle of those lines. Alternatively, an angle image grid input to the edge point filtering module by, e.g., the edge detection module can be marked to identify the angles of the filtered edge points based on the original angle information. Because an angle value can be stored in fewer bits than an entire byte, if each angle value is assigned an entire byte, bits of the byte remaining beyond the value can be employed as flags to indicate an angle byte to be filtered out, or alternatively, to be retained in correspondence with the filtered edge point information.

The row-exploitative object edge point filtering system was implemented as an edge point filtering module for a pre-existing, commercially-available hardware machine vision system, the Cognex 4400 vision processor, available from Cognex Corporation, Natick Mass. This machine vision system is a digital, VMEbus-based (i.e., Vera Module Eurocard-based) vision computer employing a MC68030 microprocessor. The system integrates a MC68030 CPU, running at 25 megahertz, with an image acquisition subsystem, as described earlier in the discussion, with a memory-mapped frame buffer, 8 megabytes of user RAM, and two custom ASIC coprocessor chips for hardware acceleration of certain core processing operations. Other details of the Cognex 4400 vision processor are described in "Cognex 2000/3000/4000/5000 Hardware, Revision 6.0," Cognex Part No. 590-0105, 1993, available from Cognex. The edge point filtering functions were implemented on the hardware vision system in the C programming language, utilizing the accelerated histogramming and pixel mapping functions available with the Cognex 4400 vision processor.

Three edge point filtering tasks were constructed to compare the edge point filtering system of the invention with a conventional, recursive dual-threshold implementation. The filtering tasks were based on three different views of a semiconductor manufacturing component, each of a different rectangular size, and each including a different number of possible object edge points. The image was specifically produced to be of low-contrast, with a large fraction of the relevant object edge information in low-contrast regions. Table 2 below lists the specific size and pre-filtering edge count for the three images. The three images were processed by the filtering system of the invention implemented with the row-exploitative technique previously described on a Cognex vision system hardware platform, as given above. For equality of implementation in the comparison, the conventional recursive dual-thresholding technique was also implemented on a Cognex vision system hardware platform.

Each of the three images to be processed consisted of 8-bit pixel values produced by a conventional Sobel edge detection process, as described above. Both the conventional filtering system and the filtering system of the invention were specified with a high edge magnitude threshold value of 25 and a low edge magnitude threshold value of 15. Each of the three images was processed by the two systems, and the time required for processing was noted. In the table below, the "Time Conventional" column lists the times required for the conventional system to filter the three input images, and the "Time Invention" column lists the times required for the filtering system of the invention to filter the three input images; these times are given in milliseconds. It must be recognized that the times given reflect the processing capabilities of the specific hardware platform employed here; a different hardware platform would result in different processing speeds.

TABLE 2

Edge Point Filtering Performance Comparison

| Image Size | Pre-Filtering Edge Count | Post-Filtering Edge Count | Time Conventional | Time Invention | Ratio of Times |
|---|---|---|---|---|---|
| 128 × 128 | 5,203 | 4,205 | 398 | 78 | 5.53 |
| 256 × 256 | 21,922 | 15,800 | 1,498 | 249 | 6.02 |
| 512 × 480 | 82,899 | 65,943 | 6,190 | 988 | 6.27 |

The last column of the table, "Ratio of Times," gives the ratio of the speed of the filtering system of the invention to the speed of the conventional recursive system. The filtering system of the invention is seen to provide a processing speed of 5–6 times that of the conventional system, yet to achieve identical edge filtering capability. As explained previously, the synergy of the various features provided by the filtering system of the invention enables this speed as a result of a level of edge point filtering efficiency that far surpasses that of the conventional recursive implementation.

Other object edge filtering system implementations are contemplated by the invention. For example, a general purpose computer with, e.g., a general purpose microprocessor, such as one from the 386, 486, or 586 microprocessor classes, is adequate for implementation of the filtering system. The performance of the filtering system is directly linked to the performance characteristics of the hardware or computer on which the system is implemented. For example, the better the performance characteristics, e.g., speed, of a selected microprocessor, the faster the filtering system can operate. This is a particular advantage of the invention; no parthardwa custom hardware is required, and as general purpose hardware performance improves, so too does the filtering system performance implicitly improve. Accordingly, the latest generation of general purpose computer systems, e.g., Pentium™ or PowerPC™ processors provide an implementation platform that can achieve comparable performance to that achieved on customized hardware. As will be recognized by those skilled in the art, a software language other than the C language can be employed for implementing the edge filtering functionality on a selected hardware platform. Any suitable software language that is compatible with selected hardware and that can effectively implement the pseudo-code sequences provided earlier can be employed.

The object edge point filtering system can be applied to a wide range of machine vision applications beyond the computer disk assembly application described earlier. For example, alignment, guidance, gauging, character recognition, and other automated machine vision applications can benefit from incorporation of the edge point filtering system into the overall vision system such that filtered object edge point information is used by later vision processing modules. Alternatively, the filtering system of the invention can be configured to directly output filtered object edge information to an operator for, e.g., input of that information to a separate analysis system or for analysis and review by the operator.

From the foregoing, it is apparent that the object edge point filtering system described above not only achieves fast, efficient, and effective filtering of object edge point information, but does so using elegant and efficient object image data addressing and processing techniques. It is recognized, of course, that those skilled in the art may make various modifications and additions to the preferred embodiments described above without departing from the spirit and scope of the present contribution to the art. Accordingly, it is to be understood that the protection sought to be afforded hereby should be deemed to extend to the subject matter of the claims and all equivalents thereof fairly within the scope of the invention.

I claim:

1. A method for filtering possible edge points in an edge image represented by an array of edge image coordinates each having an edge point magnitude in a preselected range of edge point magnitudes, the edge image corresponding to an image of an object represented by an array of pixels, comprising the steps of:

a. forming an edge map array of edge map coordinates arranged in correspondence with the edge image, each edge map coordinate assigned one of three preselected edge indicator values indicative of a relationship between the corresponding edge image coordinate edge point magnitude and two preselected edge point magnitude thresholds, the assigned edge map coordinate values being stored in an addressable memory;

b. forming an output edge point array of output edge point coordinates arranged in correspondence with the edge image, comprising the steps of:

c. initializing each output edge point coordinate to a first of two preselected edge point values, the initialized coordinate values being stored in an addressable memory;

d. constructing a first address stack to track memory addresses at which edge map coordinate values in the edge map array are stored;

e. constructing a second address stack to track memory addresses at which output edge point coordinate values in the output edge point array are stored;

f. assigning to selected of the initialized output edge point coordinates the second preselected edge point value, comprising the steps of:

g. scanning the edge map array for an edge map coordinate assigned the first preselected edge indicator value;

h. pushing on the first stack the edge map array address of a first encountered edge map coordinate assigned the first preselected edge indicator value;

i. pushing on the second stack the output edge point array address corresponding to the edge map array address pushed on the first stack in step h;

j. popping off of the first and second stacks the edge map coordinate address and corresponding output edge point coordinate address, respectively most recently pushed on the stacks;

k. assigning to the edge map coordinate whose address was popped off of the first stack in step j the third edge indicator value;

l. assigning to the output edge point coordinate whose address was popped off the second stack in step j the second preselected edge point value;

m. examining edge map coordinates in the edge map array that neighbor the edge map coordinate whose address was popped off the first stack in step j for any edge map coordinates assigned either the first or second preselected edge indicator values;

n. pushing on the first stack addresses of edge map coordinates found in step m to be assigned either the first or second preselected edge indicator values;

o. pushing on the second stack the output edge point coordinate address corresponding to any edge map array address pushed on the first stack in step n;

p. repeating steps j–o until all addresses are popped off the first and second stacks;

q. repeating steps g–p until the edge map array is entirely scanned, those selected output edge point coordinates in the resulting output edge point array assigned with the second preselected edge point value each representing a likely edge point in the object image.

2. The method of claim 1 wherein the two preselected edge point magnitude thresholds comprise a high magnitude threshold and a low magnitude threshold less than the high magnitude threshold.

3. The method of claim 2 wherein the three preselected edge indicator values comprise a first edge indicator value for indicating that an edge magnitude in the edge image is greater than the high edge magnitude threshold, a second edge indicator value for indicating that an edge magnitude in the edge image is equal to or less than the high edge magnitude threshold but greater than or equal to the low edge magnitude threshold, and a third edge indicator value for indicating that an edge magnitude in the edge image is less than the low edge magnitude threshold.

4. The method of claim 3 wherein the two preselected edge point values comprise a first edge point value for indicating that an output edge point coordinate does not likely represent an edge point in the object image, and a second edge point value for indicating that an output edge point coordinate does likely represent an edge point in the object image.

5. The method of claim 1 wherein the steps of constructing first and second stacks each further comprise the steps of determining the number of edge map coordinates in the edge map array assigned either the first or second preselected edge indicator values, and allocating a number of entries in each stack equal to at least the number of edge map coordinates assigned the either the first or second preselected edge indicator values.

6. The method of claim 1 wherein the steps of constructing first and second stacks each further comprise the steps of determining the total number of edge map coordinates in the edge map array, and allocating a number of entries in each stack equal to at least the total number of edge map coordinates.

7. The method of claim 1 wherein the step of examining edge map coordinates in the edge map array that neighbor the edge map coordinate whose address was popped off the first stack in step j comprises examining each of eight edge map coordinates that are closest neighbors to the edge map coordinate whose address was popped off the first stack.

8. The method of claim 1 wherein the step of forming an edge map array further comprises providing the edge map array with bounding rows and columns of edge map coordinates that together surround the array, each edge map coordinate in the bounding rows and columns assigned the third preselected edge indicator value.

9. The method of claim 1 wherein the step of scanning the edge map array for an edge map coordinate assigned the first preselected edge indicator value comprises the steps of forming a packet of digital bits representative of consecutive edge map coordinates in a row of the edge map array, and examining the packet of digital bits for the first preselected edge indicator value.

10. The method of claim 9 wherein each edge map coordinate value comprises a number, n, of bits, and the packet of digital bits includes an integer multiple of the number, n, of bits.

11. The method of claim 1 wherein the step of assigning to the edge map coordinate whose address was popped off of the first stack in step j the third edge indicator value, the step of assigning to the output edge point coordinate whose address was popped off the second stack in step j the second preselected edge point value, the step of examining edge map coordinates in the edge map array that neighbor the edge map coordinate whose address was popped off the first stack in step j, and the step of pushing on the first stack the address of any neighbor edge map coordinates found to be assigned either the first or second preselected edge indicator values together comprise the steps of:

examining edge map coordinates in the same row as the popped edge map coordinate address to locate edge map coordinates in that row assigned either the first or second preselected edge indicator values and located in an unbroken sequence including the edge map coordinate whose address was popped, and assigning to any such located coordinates and the popped edge map coordinate the third preselected edge indicator value, with the corresponding output edge point array coordinates assigned the second edge point value;

examining edge map coordinates in the row just above and the row just below the popped edge map coordinate beginning with an edge map coordinate in each of these rows that has an address one less than a leftmost edge map coordinate identified in the unbroken sequence and ending with an edge map coordinate in each of these rows that has an address one greater than a rightmost edge map coordinate identified in the unbroken sequence and based on the examination pushing on the first stack the address of each examined edge map coordinate in above and below rows that is both assigned either the first or second preselected edge indicator values and is either a first edge map coordinate examined in a given row or is located after an edge map coordinate assigned the third preselected edge indicator value.

12. The method of claim 1 further comprising the step of forming an edge point template representing an image of likely edge points in the object image based on the output edge point array.

13. The method of claim 1 further comprising the step of forming an edge point address list of the memory addresses corresponding to the output edge point array coordinates in the output edge point array assigned the second preselected edge point value.

14. The method of claim 1 further comprising the step of forming an edge point angle map array of edge angle values arranged in correspondence with the edge image, the edge angle values representing the angular orientation of corresponding output edge points in the output edge point array.

15. The method of claim 1 further comprising the step of forming the edge image by performing Sobel edge detection analysis on the object image.

16. The method of claim 1 further comprising the step of forming a filtered object image by setting to zero all pixels in a copy of the object image that correspond to output edge point coordinates in the output edge point array assigned with the first preselected edge point value.

17. A system for filtering possible edge points in an edge image represented by an array of edge image coordinates each having an edge point magnitude in a preselected range of edge point magnitudes, the edge image corresponding to an image of an object represented by an array of pixels, comprising:

means for forming an edge map array of edge map coordinates arranged in correspondence with the edge image array, each edge map coordinate assigned one of three preselected edge indicator values indicative of a relationship between the corresponding edge image coordinate edge point magnitude and two preselected edge threshold values, the assigned edge map coordinate values being stored in an addressable memory;

means for forming an output edge point array of output edge point coordinates arranged in correspondence with the edge image, means for initializing each output edge point coordinate to a first of two preselected edge point values, the initialized output edge point coordinate values being stored in an addressable memory;

a first address stack for tracking memory addresses at which edge map coordinate values in the edge map array are stored;

a second address stack for tracking memory addresses at which output edge point coordinate values in the output edge point array are stored;

means for assigning to selected initialized output edge point coordinates the second preselected edge point value, means for scanning the edge map array for an edge map coordinate assigned the first preselected edge indicator value;

means for pushing on the first stack the edge map array address of a first encountered edge map coordinate assigned the first preselected edge indicator value;

means for pushing on the second stack the output edge point array address corresponding to the edge map array address pushed on the first stack;

means for popping off of the first and second stacks the edge map coordinate address and corresponding output edge point coordinate address, respectively most recently pushed on the stacks;

means for assigning to the edge map coordinate whose address was popped off of the first stack the third edge indicator value;

means for assigning to the output edge point coordinate whose address was popped off the second stack the second preselected edge point value;

means for examining edge map coordinates in the edge map array that neighbor the edge map coordinate whose address was popped off the first stack for any edge map coordinates assigned either the first or second preselected edge indicator values;

means for pushing on the first stack addresses of edge map coordinates found to be assigned either the first or second preselected edge indicator values;

means for pushing on the second stack the output edge point coordinate address corresponding to any edge map array address pushed on the first stack, those selected output edge points in the resulting output edge point array assigned with the second preselected edge point value each representing a likely edge point in the object image.

18. The system of claim 17 wherein the two preselected edge point magnitude thresholds comprise a high magnitude threshold and a low magnitude threshold less than the high magnitude threshold.

19. The system of claim 18 wherein the three preselected edge indicator values comprise a first edge indicator value for indicating that an edge point magnitude in the edge image is greater than the high edge point magnitude threshold, a second edge indicator value for indicating that an edge point magnitude in the edge image is equal to or less than the high edge point magnitude threshold but greater than or equal to the low edge point magnitude threshold, and a third edge indicator value for indicating that an edge point magnitude in the edge image is less than the low edge point magnitude threshold.

20. The system of claim 19 wherein the two preselected edge point values comprise a first edge point value for indicating that an output edge point coordinate does not likely represent an edge point in the object image, and a second edge point value for indicating that an output edge point coordinate does likely represent an edge point in the object image.

21. The system of claim 17 wherein the first and second stacks are each allocated with a number of stack entries equal to at least the number of edge map coordinates in the edge map array that are each assigned either the first or second preselected edge indicator values.

22. The system of claim 17 wherein the first and second stacks are each allocated with a number of stack entries equal to at least the total number of edge map coordinates in the edge map array.

23. The system of claim 17 wherein the means for examining edge map coordinates in the edge map array that neighbor the edge map coordinate whose address was popped off the first stack comprises means for examining each of eight edge map coordinates that are closest neighbors to the edge map coordinate whose address was popped off the first stack.

24. The system of claim 17 wherein the means for forming an edge map array further comprises means for providing the edge map array with bounding rows and columns of edge map coordinates that together surround the array, each edge map coordinate in the bounding rows and columns being assigned the third preselected edge indicator value.

25. The system of claim 17 wherein the means for scanning the edge map array for an edge map coordinate assigned the first preselected edge indicator value comprises means for forming a packet of digital bits representative of consecutive edge map coordinates in a row of the edge map array, and examining the packet of digital bits for the first preselected edge indicator value.

26. The system of claim 25 wherein each edge map coordinate value comprises a number, n, of bits, and the packet of digital bits includes an integer multiple of the number, n, of bits.

27. The system of claim 17 wherein the means for assigning to the edge map coordinate whose address was popped off of the first stack the third edge indicator value, the means for assigning to the output edge point coordinate whose address was popped off the second stack the second preselected edge point value, the means for examining edge map coordinates in the edge map array that neighbor the edge map coordinate whose address was popped off the first stack, and the means for pushing on the first stack the address of any neighbor edge map coordinates found to be assigned with either the first or second preselected edge indicator values together comprise:

means for examining edge map coordinates in the same row as the popped edge map coordinate address to locate edge map coordinates in that row assigned either the first or second preselected edge indicator values and located in an unbroken sequence including the edge map coordinate whose address was popped, assigning to any such located coordinates and the popped edge map coordinate the third preselected edge indicator value, with the corresponding output edge point array coordinates assigned the second edge point value;

means for examining edge map coordinates in the row just above and the row just below the popped edge map coordinate address beginning with an edge map coordinate in each of these rows that has an address one less than a leftmost edge coordinate identified in the unbroken sequence and ending with an edge map coordinate in each of these rows that has an address one greater than a rightmost edge map coordinate identified in the unbroken sequence; and means for pushing on the first stack, based on the examination, the address of each examined edge map coordinated in above and below rows that is both assigned either the first or second preselected edge indicator values and is either a first map coordinate examined in a given row or is located after an edge map coordinate assigned the third preselected edge indicator value.

28. The system of claim 17 further comprising means for forming an edge point template representing an image of likely edge points in the object image based on the output edge point array.

29. The system of claim 17 further comprising means for forming an edge point address list of the memory addresses corresponding to the output edge point coordinates in the output edge point array assigned the second preselected edge point value.

30. The system of claim 17 further comprising means for forming an edge point angle map array of edge angle values arranged in correspondence with the edge image, the edge angle values representing the angular orientation of corresponding output edge points in the output edge point array.

31. The system of claim 17 further comprising a Sobel edge detector for analyzing the object image to produce the edge image.

32. The system of claim 17 further comprising means for forming a filtered object image in which all pixels in a copy of the object image that correspond to coordinates in the output edge point array assigned with the first preselected edge point value are set to zero.

* * * * *